(12) United States Patent
Kurita et al.

(10) Patent No.: US 9,123,102 B2
(45) Date of Patent: Sep. 1, 2015

(54) IMAGE PROCESSING APPARATUS, IMAGING APPARATUS, IMAGE PROCESSING METHOD, AND COMPUTER READABLE MEDIUM STORING INSTRUCTIONS FOR PERFORMING IMAGE CORRECTION

(71) Applicant: Sony Corporation, Tokyo (JP)

(72) Inventors: Teppei Kurita, Tokyo (JP); Tomoo Mitsunaga, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 128 days.

(21) Appl. No.: 13/780,243

(22) Filed: Feb. 28, 2013

(65) Prior Publication Data

US 2013/0266219 A1   Oct. 10, 2013

(30) Foreign Application Priority Data

Apr. 6, 2012   (JP) .................................. 2012-087776

(51) Int. Cl.
  *G06K 9/00*   (2006.01)
  *G06T 5/00*   (2006.01)
(52) U.S. Cl.
  CPC ................. *G06T 5/002* (2013.01); *G06T 5/008* (2013.01); *G06T 2207/10024* (2013.01)
(58) Field of Classification Search
  USPC ......... 382/167, 173, 199, 254, 268, 269, 274, 382/275; 348/222.1, 242
  See application file for complete search history.

(56) References Cited

U.S. PATENT DOCUMENTS

| | | | |
|---|---|---|---|
| 5,862,257 A * | 1/1999 | Sekine et al. ................. | 382/199 |
| 6,317,522 B1 * | 11/2001 | Rackett ......................... | 382/268 |
| 8,471,921 B1 * | 6/2013 | Li ............................... | 348/222.1 |
| 8,792,746 B2 * | 7/2014 | Iso et al. ....................... | 382/269 |
| 8,891,866 B2 * | 11/2014 | Shinozaki ..................... | 382/167 |
| 2012/0288198 A1 * | 11/2012 | Tojo et al. ..................... | 382/173 |
| 2012/0314946 A1 * | 12/2012 | Nomura et al. ............... | 382/167 |
| 2013/0266219 A1 * | 10/2013 | Kurita et al. .................. | 382/167 |

FOREIGN PATENT DOCUMENTS

| | | |
|---|---|---|
| JP | 2006-302023 A | 11/2006 |
| JP | 2010-239271 A | 10/2010 |

* cited by examiner

*Primary Examiner* — Amir Alavi
(74) *Attorney, Agent, or Firm* — Hazuki International, LLC

(57) ABSTRACT

There is provided an image processing apparatus including a representative pixel calculation unit configured to select some pixels in an input image as representative pixels, a representative pixel update unit configured to update pixel values of the representative pixels, and a corrected image generation unit configured to set pixel values for pixels other than the representative pixels by applying the updated pixel values of the representative pixels. The representative pixel update unit is configured to, based on pixels around a position of the representative pixels in a smoothed image generated based on the input image as reference pixels, execute pixel value correction of the representative pixels by applying the pixel values of the reference pixels.

12 Claims, 20 Drawing Sheets

IMAGE PROCESSING APPARATUS, IMAGING APPARATUS, IMAGE PROCESSING METHOD, AND COMPUTER READABLE MEDIUM STORING INSTRUCTIONS FOR PERFORMING IMAGE CORRECTION

BACKGROUND

The present disclosure relates to an image processing apparatus, an imaging apparatus, an image processing method, and a program. More particularly, the present disclosure relates to an image processing apparatus, an imaging apparatus, an image processing method, and a program for performing image correction such as reducing noise included in an image.

An image sensor, such as a CCD sensor or a CMOS (complementary metal oxide semiconductor), that is used in a video camera or a still camera accumulates charge based on the amount of incident light, and performs photoelectric conversion for outputting an electric signal corresponding to the accumulated charge. A color filter for individually accumulating signals corresponding to specific wavelength light, namely, a specific color, for each pixel unit is mounted in such an image sensor. For example, a filter having a Bayer array configured from the respective colors of red, green, and blue (RGB) is often used.

On the other hand, recently, pixels are becoming smaller due to the decreasing size of image sensors and the increasing number of pixels. An image sensor having such a high density of pixels is important when capturing high-resolution images.

However, the amount of charge that can be accumulated per pixel in an image sensor having such a high density of pixels is reduced, so that there is the problem that the noise amount included in the signal from each pixel is comparatively greater.

For example, especially for images captured under low illuminance, the S/N ratio of the color signals (chroma signals) deteriorates due to the carrying out of a large gain adjustment as well as gamma correction and the like, which leads to substantial unevenness in the color signals, namely, chroma noise, of the output image.

As a related-art technology disclosing reduction processing of such chroma noise, for example, JP 2006-302023-A discloses a configuration that executes correction processing based on the pixel values of surrounding pixels using a bilateral filter as a smoothing filter to reduce the noise included in the pixels.

However, since a reference pixel area of a bilateral filter is a comparatively narrow pixel area, it is difficult in correction processing that uses a bilateral filter to remove ultra-low frequency chroma noise spread out over a wide area.

Further, JP 2010-239271-A discloses a configuration that performs noise reduction by executing interpolation processing, in which the pixel values in a noise area are set by utilizing the pixel values of representative pixels obtained by calculating a statistic consisting of two elements, "color" and "position", from an image and determining the representative pixels in area units based on analysis of the calculated statistic.

With this configuration, it is possible to remove the low-frequency chroma noise that is not resolved by the above-described bilateral filter.

However, in this configuration, there is the problem that if noise is included in the selected representative pixels themselves, the noise reduction effect substantially deteriorates.

SUMMARY

According to an embodiment of the present disclosure, for example, which is configured in view of the above-described problems, there is provided an image processing apparatus, an imaging apparatus, an image processing method, and a program for performing image correction such as removing noise, such as chroma noise, included in an image.

According to a first embodiment of the present disclosure, there is provided an image processing apparatus including a representative pixel calculation unit configured to select some pixels in an input image as representative pixels, a representative pixel update unit configured to update pixel values of the representative pixels, and a corrected image generation unit configured to set pixel values for pixels other than the representative pixels by applying the updated pixel values of the representative pixels. The representative pixel update unit is configured to, based on pixels around a position of the representative pixels in a smoothed image generated based on the input image as reference pixels, execute pixel value correction of the representative pixels by applying the pixel values of the reference pixels.

Further, the representative pixel calculation unit may be configured to generate a YCbCr image in which luminance Y and color difference Cb and Cr pixel values are set for each pixel based on the input image, and generate a representative pixel image formed from representative pixels in which unique YCbCr pixel values, respectively, are set for the representative pixels, and non-representative pixels in which a unique luminance Y and uniform Cb and Cr values are set for each pixel, based on the YCbCr image. The representative pixel update unit may be configured to, based on pixels around a position of the representative pixels in a color difference smoothed image generated by executing color difference smoothening processing on the YCbCr image as reference pixels, execute pixel value update of the representative pixels by applying the pixel values of the reference pixels.

Further, the representative pixel update unit may be configured to update the respective pixel values of color difference information Cb and Cr of the representative pixels by applying the respective pixel values of the color difference information Cb and Cr of pixels around a position of the representative pixels in a color difference smoothed image generated by executing color difference smoothening processing on the YCbCr image.

Further, the representative pixel update unit may be configured to calculate a reliability of each pixel value of the color difference smoothed image based on a pixel value difference between the color difference smoothed image and the YCbCr image, and calculate an updated pixel value of the representative pixels by setting a pixel value contribution ratio of the reference pixels based on the reliability.

Further, the representative pixel update unit may be configured to calculate an updated pixel value of the representative pixels by setting a pixel value contribution ratio of the reference pixels based on a weighting that is set so as to decrease the greater a distance between the reference pixels and the representative pixels is.

Further, the representative pixel calculation unit may be configured to perform a representative pixel calculation by executing clustering processing that applies a K-means method (K averaging method).

Further, the representative pixel calculation unit may be configured to perform a representative pixel calculation by executing clustering processing that applies a K-means method (K averaging method) on a reduced image obtained by reducing a YCbCr image generated from the input image.

Further, the representative pixel calculation unit may be configured to perform a representative pixel calculation by executing clustering processing that applies a K-means method (K averaging method) on a reduced image obtained by reducing a YCbCr image generated from the input image, and generate an image having the same number of pixels as the input image based on upsampling processing.

Further, the corrected image generation unit may be configured to generate color difference information Cb and Cr about non-representative pixels based on interpolation processing that applies color difference information Cb and Cr set in the updated representative pixels by the representative pixel update unit.

Further, the corrected image generation unit may be configured to generate the color difference information Cb and Cr about non-representative pixels by utilizing a local linear correlation between luminance Y and color difference Cb and Cr.

Further, according to a second embodiment of the present disclosure, there is provided an image processing apparatus including a representative pixel calculation unit configured to select some pixels in an input image as representative pixels, a band separation luminance image generation unit configured to generate a band separation luminance image based on an input image, a representative pixel update unit configured to update pixel values of the representative pixels, and a corrected image generation unit configured to generate a gradation-corrected image of the input image by applying the updated pixel values of the representative pixels and the band separation luminance image. The representative pixel update unit is configured to generate a representative pixel updated image on which gradation correction was executed on an average luminance component of a representative pixel image generated based on the input image, and the corrected image generation unit is configured to generate a gradation-corrected image of the input image by applying the representative pixel updated image.

Further, the band separation luminance image generation unit may be configured to generate, based on the input image, a luminance low-frequency image in which a luminance low-frequency signal is a pixel value and a luminance high-frequency image in which a luminance high-frequency signal is a pixel value.

Further, according to a third embodiment of the present disclosure, there is provided an image processing apparatus including a representative pixel calculation unit configured to select some pixels in an input image as representative pixels, a representative pixel update unit configured to update pixel values of the representative pixels, and a corrected image generation unit configured to set pixel values for pixels other than the representative pixels by applying the updated pixel values of the representative pixels. The representative pixel update unit is configured to execute pixel value update of the representative pixels by converting the pixel values of the representative pixels based on a calculation using a matrix in which a pixel value coordinate conversion parameter is set.

Further, according to a forth embodiment of the present disclosure, there is provided an image processing method executed in an image processing apparatus, the method including a representative pixel calculation unit executing representative pixel calculation processing to select some pixels in an input image as representative pixels, a representative pixel update unit executing representative pixel update processing to update pixel values of the representative pixels, and a corrected image generation unit executing corrected image generation processing to set pixel values for pixels other than the representative pixels by applying the updated pixel values of the representative pixels. In the representative pixel update processing, the representative pixel update unit is configured to, based on pixels around a position of the representative pixels in a smoothed image generated based on the input image as reference pixels, execute pixel value correction of the representative pixels by applying the pixel values of the reference pixels.

Further, according to a fifth embodiment of the present disclosure, there is provided a program that executes image processing in an image processing apparatus, the program configured to make a representative pixel calculation unit execute representative pixel calculation processing to select some pixels in an input image as representative pixels, a representative pixel update unit execute representative pixel update processing to update pixel values of the representative pixels, and a corrected image generation unit execute corrected image generation processing to set pixel values for pixels other than the representative pixels by applying the updated pixel values of the representative pixels. In the representative pixel update processing, the representative pixel update unit is configured to, based on pixels around a position of the representative pixels in a smoothed image generated based on the input image as reference pixels, execute pixel value correction of the representative pixels by applying the pixel values of the reference pixels.

Note that the program according to the present disclosure is a program that can be provided in a storage medium or communication medium that is provided in a computer-readable form for an information processing device or a computer system that is capable of executing various types of program code, for example. Providing this sort of program in a computer-readable form makes it possible to implement the processing according to the program in the information processing device or the computer system.

The purposes, features, and advantages of the present disclosure will be made clear later by a more detailed explanation that is based on the embodiments of the present disclosure and the appended drawings. Furthermore, the system in this specification is not limited to being a configuration that logically aggregates a plurality of devices, all of which are contained within the same housing.

According to a configuration of an embodiment of the present disclosure, an apparatus and a method for generating an image with little noise are realized.

Specifically, for example, the apparatus according to the present disclosure has a representative pixel calculation unit configured to select some pixels in an image as representative pixels, a representative pixel update unit configured to update pixel values of the representative pixels, and a corrected image generation unit configured to set pixel values for pixels other than the representative pixels by applying the updated pixel values of the representative pixels. The representative pixel update unit is configured to, based on pixels around a position of the representative pixels in a smoothed image generated based on an input image as reference pixels, execute pixel value correction of the representative pixels by applying the pixel values of the reference pixels. For example, the representative pixel update unit is configured to calculate updated pixel values of the representative pixels by setting a reliability of each pixel value of a color difference smoothed image based on a pixel value difference between the color difference smoothed image and the input image, and a contribution ratio based on a weighting that is based on a distance between the reference pixels and the representative pixels.

Based on these processes, the setting of more accurate representative pixels and generation of and reduced-noise images are realized, in which the chance of mistaken pixel values being set for the representative pixels is decreased.

DETAILED DESCRIPTION OF THE EMBODIMENT(S)

Figure 1:
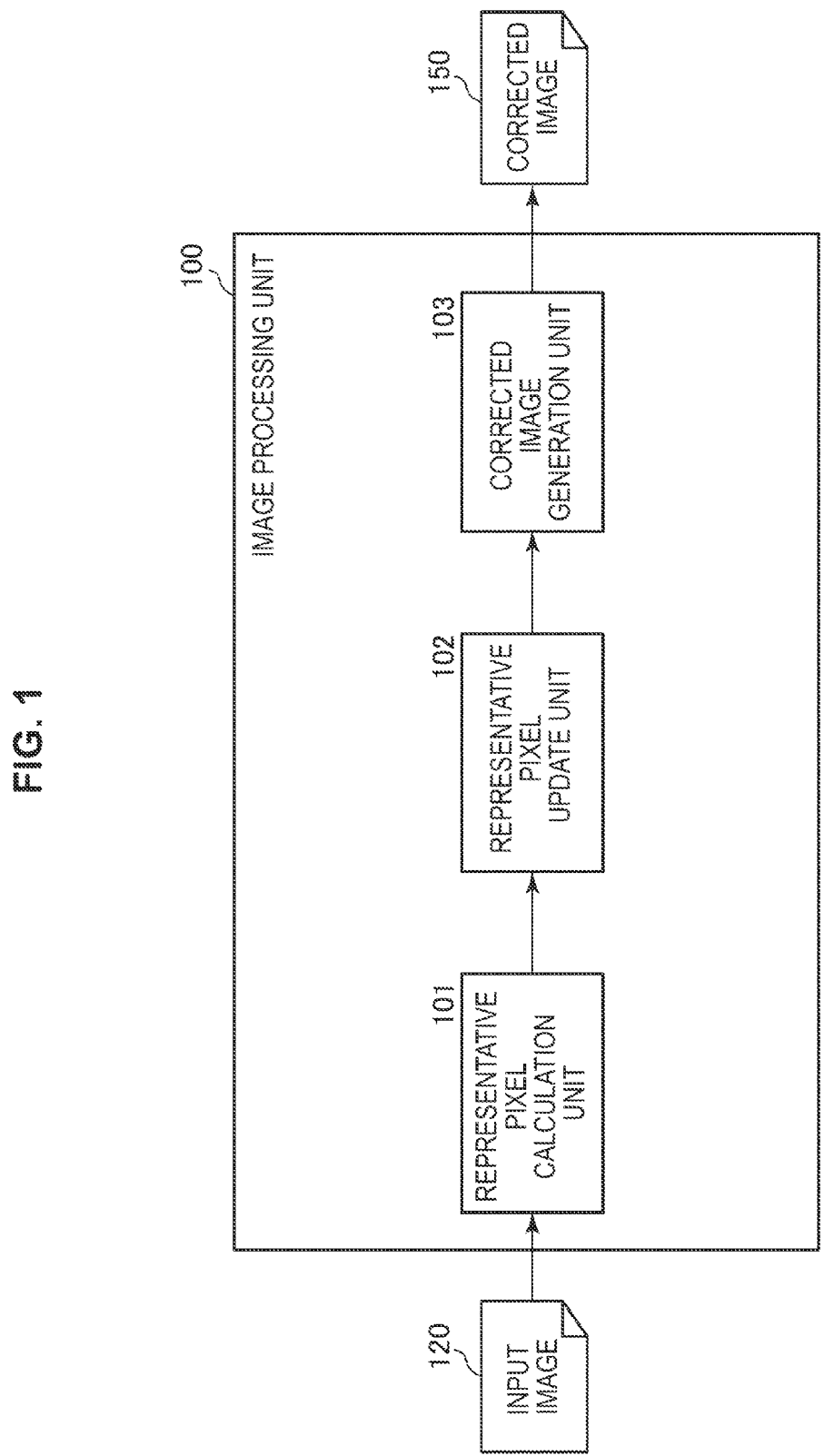
FIG. 1 is a diagram illustrating a configuration example of an image processing unit in an image processing apparatus according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The image processing apparatus, imaging apparatus, image processing method, and program according to embodiments of the present disclosure will now be described in the following order with reference to the drawings.

1. Outline of the configuration and processing of the image processing apparatus according to a first embodiment of the present disclosure
2. Processing executed by representative pixel calculation unit
3. Processing executed by representative pixel update unit
4. Processing executed by corrected image generation unit
5. Other embodiments of the present disclosure
5-1. Embodiment in which gradation correction is performed
5-2. Embodiment in which false color correction and storage color correction are performed
6. Summary of the configuration according to the present disclosure 1. Outline of the Configuration and Processing of the Image Processing Apparatus According to a First Embodiment of the Present Disclosure First, an outline of the configuration of the image processing apparatus according to a first embodiment of the present disclosure, and the processing performed by this image processing apparatus, will be described.

The image processing apparatus according to a first embodiment of the present disclosure performs processing for reducing the noise, especially chroma noise, included in an image.

Note that the image processing apparatus according to this embodiment of the present disclosure can be specifically realized by various apparatuses, such as an imaging apparatus like a camera that captures images, or an information processing apparatus like a PC that reads an image from a recording medium on which an image is recorded and executes processing.

FIG. 1 is a block diagram illustrating the main configuration of an image processing unit 100 that executes noise reduction in the image processing apparatus according to a first embodiment of the present disclosure.

The image processing unit 100 inputs an input image 120, which is an image on which noise reduction processing is to be performed, and outputs a corrected image 150 on which noise reduction was executed.

The image processing unit 100 illustrated in FIG. 1 includes, for example, a DSP (digital signal processor) in the imaging apparatus. Alternatively, the image processing unit 100 can be configured in an image processing apparatus such as a PC that executes processing based on a program that prescribes the image processing according to the present disclosure.

As illustrated in FIG. 1, the image processing unit 100 includes a representative pixel calculation unit 101, a representative pixel update unit 102, and a corrected image generation unit 103.

First, an outline of the processing executed by each of these processing units will be briefly described. The processing executed by each of these processing units will be described in more detail below.

The representative pixel calculation unit 101 acquires the position and pixel values of representative pixels from the input image 120.

Note that the representative pixels are pixels having pixel values that will serve as a color information reference when performing the color information addition processing on the pixels other than the representative pixels, for example.

In the below-described embodiments of the present disclosure, an example is described in which the processing is performed by setting color difference information, for example color difference information about Cb, Cr and the like in YCbCr pixel values, as the pixel values of the representative pixels. Therefore, the term "representative pixel" in the below-described embodiments of the present disclosure means a pixel having a "representative color".

The representative pixel update unit 102 corrects the pixel values of the representative pixels set by the representative pixel calculation unit 101 based on a weighting and a reliability calculated according to a predetermined algorithm, and updates the pixel values of the representative pixels.

Specifically, the pixel values of the representative pixels are updated by generating a color difference smoothed image of a YCbCr image, and based on the pixels (N×N pixels) around a representative pixel corresponding position of the generated color difference smoothed image as reference pixels, applying the pixel values of the reference pixels.

During this representative pixel pixel value update processing, the greater the difference between the pixel values of the representative pixels and the luminance value of the reference pixels, and the greater (further away) the spatial distance between the representative pixels and the reference pixels, the smaller the weighting for adjusting the contribution ratio of the pixel values of the reference pixels.

Further, the contribution ratio of the pixel values of the reference pixels is changed based on the reliability $M(x,y)$ of the color difference information set for each pixel $(x,y)$ in the color difference smoothed image.

The corrected image generation unit 103 utilizes the updated representative pixels obtained by the representative pixel update unit 102 to generate an output image.

The processing executed by each of the processing units will now be described in order in more detail.

2. Processing Executed by Representative Pixel Calculation Unit

The processing executed by the representative pixel calculation unit 101 will now be described in more detail with reference to FIG. 2.

Figure 2:
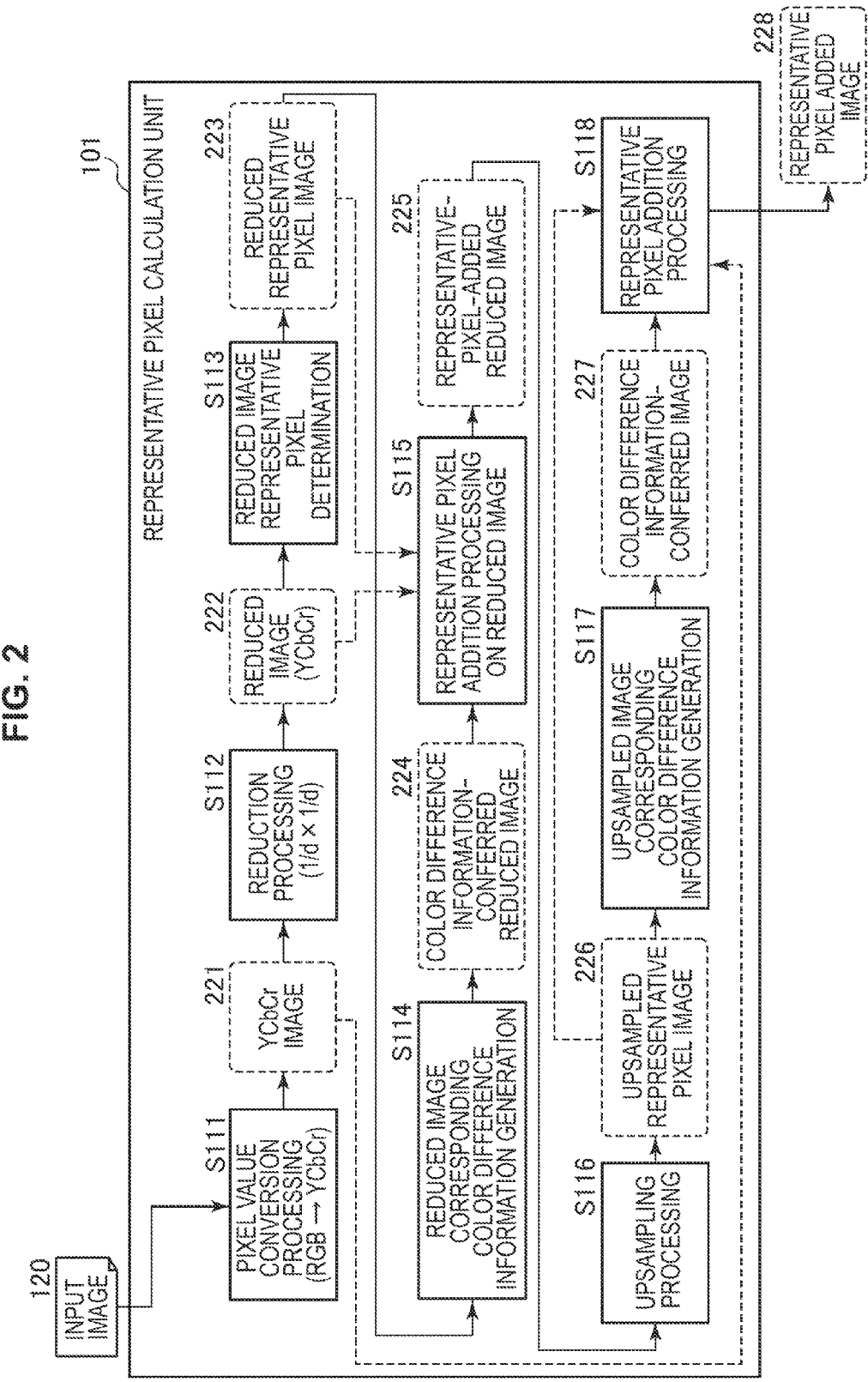
FIG. 2 is a diagram illustrating a configuration of a representative pixel calculation unit, and processing performed by this unit.

FIG. 2 is a diagram illustrating processing performed by the representative pixel calculation unit 101.

The representative pixel calculation unit 101 inputs the input image 120, namely, an image on which noise reduction processing is to be performed.

The input image 120 is, for example, an image in which RGB pixel pixel values have been set for each pixel. Specifically, the input image 120 is an image captured by an imaging apparatus, and in which a red, green, and blue (RGB) pixel value, respectively, was then set for each pixel by demosaicing, for example.

The representative pixel calculation unit 101 executes image processing on the input image 120 to generate a representative pixel added image 228, and then outputs the generated representative pixel added image 228 to the below-described representative pixel update unit 102 by executing the processes of steps S111 to S118, respectively, illustrated in FIG. 2.

The respective processes performed in steps S111 to S118 illustrated in FIG. 2 will now be described in more detail.

Note that in the embodiments of the present disclosure described below, the input image 120 is an image having a total of w×h pixels, in which
horizontal pixel number=w, and
vertical pixel number=h.

This image will be described as an image formed from 24-bit×w×h data in which 8-bit (0 to 255) RGB pixel values have been set for each of w×h pixels.

Note that in the following description, an image having w×h pixels in which the pixel values for each RGB pixel have been set as 8-bit data is expressed as follows. [RGB-8-bit-3ch-w×h image]

Namely, the image is represented by expressing, in order, the signal (pixel values) set for each pixel, the bit number of each signal, the number of signals, and the image (pixel) size.

The above-described [3 ch] means the number of signals (pixel values) set for each pixel. In the above example, this means that three pixel values, for red, green, and blue, are set for each pixel.

In this embodiment of the present disclosure, the input image 120 input into the representative pixel calculation unit 101 is a RGB-8-bit-3ch-w×h image.

(Step S111)

In step S111, the representative pixel calculation unit 101 executes pixel value conversion processing for converting the pixel values (RGB) of each pixel in the input image 120, i.e., the [RGB-8-bit-3ch-w×h image] into pixel values formed from luminance (Y) and color difference (Cb and Cr). Namely, the representative pixel calculation unit 101 generates a YCbCr image 221 by performing RGB→YCbCr image conversion processing.

The YCbCr image 221 is an image having w×h pixels in which each of the YCbCr pixel values for each pixel has been set as 8-bit data. Namely, the YCbCr image 221 is a [YCbCr-8-bit-3ch-w×h image].

The conversion from the RGB pixel values to the YCbCr pixel values is executed based on, for example, the following conversion formula.

$$Y=0.299 \times R+0.587 \times G+0.144 \times B$$

$$Cr=(R-Y) \times 0.173+128$$

$$Cb=(B-Y) \times 0.564+128$$

Note that Cb and Cr are each 8-bit data having a value from 0 to 255.

Therefore, an image in which Cr and Cb=128 is a gray image.

(Step S112)

In step S112, the representative pixel calculation unit 101 executes reduction processing on the YCbCr image 221, namely, a [YCbCr-8-bit-3ch-w×h image].

A reduced image 222 having a size of w/d×h/d (wherein d represents the reduction ratio) is generated.

The reduced image 222 is an image having w/d×h/d pixels in which each of the YCbCr pixel values for each pixel has been set as 8-bit data. Namely, the reduced image 222 is a [YCbCr-8-bit-3ch-w/d×h/d image].

Note that in step S112, reduction processing is performed on each channel image of YCbCr. Various settings are possible for the vale of the reduction ratio d, and this value can be set based on the processing capability of the image processing apparatus. Although the higher the reduction ratio setting, the smaller the calculation amount that is employed for the representative pixel calculation in the initial step, a higher reduction ratio setting also means that accuracy tends to deteriorate. Specifically, for example, for a w×d=800×600 image, it is desirable to set so that d is about $2^4$.

A specific example of the generation processing of the reduced image 222 will be described with reference to FIG. 3.

Figure 3:
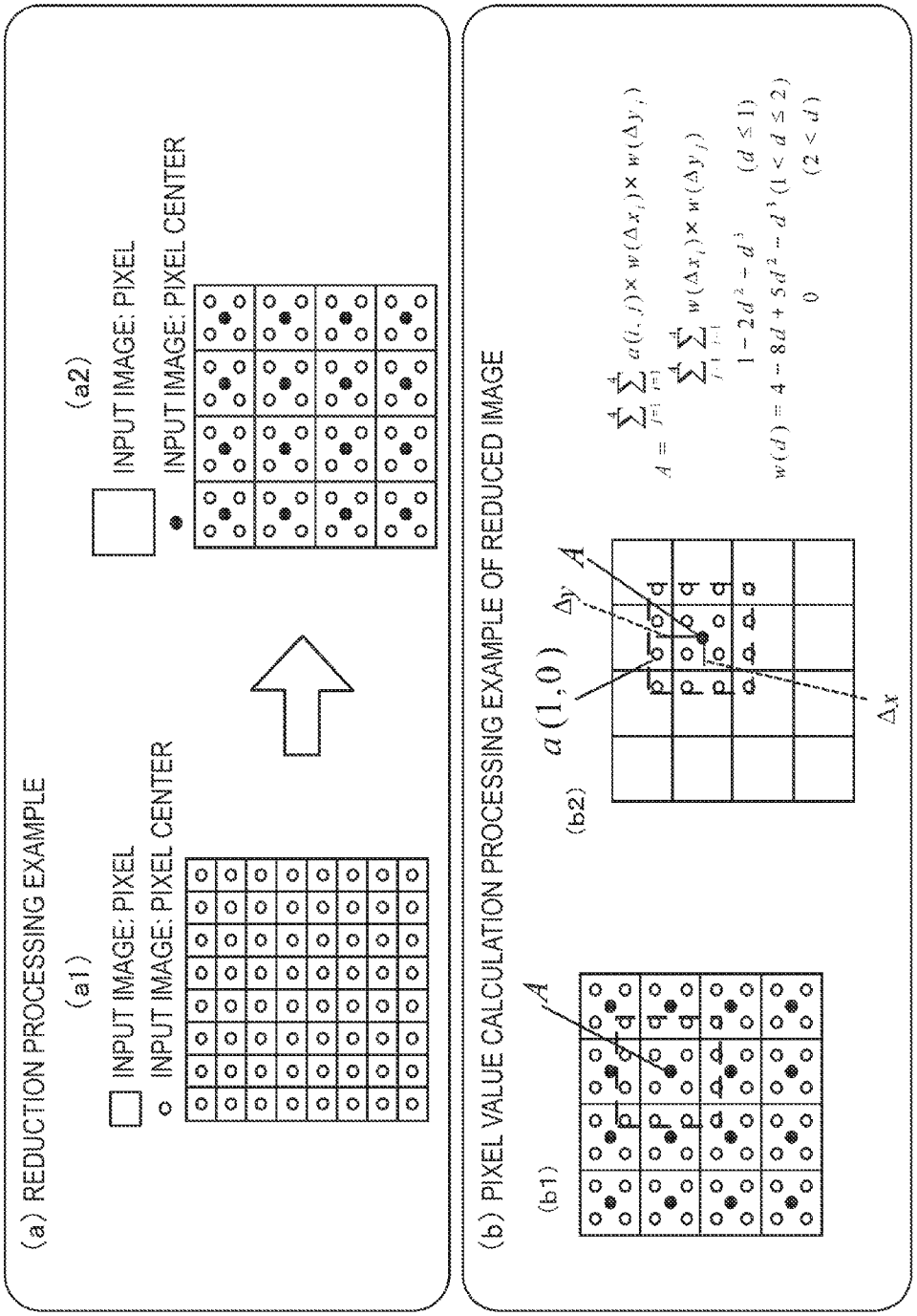
FIG. 3 is a diagram illustrating reduced image generation processing.

FIG. 3 illustrates:

(a) a reduction processing example; and (b) a pixel value calculation processing example of the reduced image 222.

The reduction processing example illustrated in (a) is a processing example of generating, an (a2) reduced image ((w/2)×(d/2)) from an (a1) input image (w×d) based on a reduction ratio d=2.

Each square in the (a1) input image corresponds to one pixel, and the round mark in the center of the squares indicates a pixel center position.

Similarly, each square in the (a2) reduced image corresponds to one pixel, and the black round mark in the center of the squares indicates a pixel center position.

The (a2) reduced image has only one pixel set for a four pixel area of the (a1) input image, so that the total number of pixels in the reduced image is ¼ that of the input image.

FIG. 3(*b*) illustrates a bicubic method processing example as an example of the pixel value calculation processing of the reduced image 222.

A processing example for calculating a pixel value A of the reduced image is illustrated in FIG. 3(*b*1).

The pixel value A of the reduced image 222 is calculated using the pixel value of a plurality of pixels from the original input image of that pixel position.

For example, pixel value calculation processing is performed using the pixels of n×n original images around the pixel position of the reduced image 222. For example, when n=4, 4×4 reference pixels are applied, so that the pixel value A for one pixel in the reduced image 222 is calculated based on the following (Formula 1).

$$A = \frac{\sum_{j=1}^{4}\sum_{i=1}^{4} a(i,j) \times w(\Delta x_i) \times w(\Delta y_i)}{\sum_{j=1}^{4}\sum_{i=1}^{4} w(\Delta x_i) \times w(\Delta y_i)} \quad \text{(Formula 1)}$$

wherein $$w(d) = 1 - 2d^2 + d^3 \quad (d \le 1)$$
$$= 4 - 8d + 5d^2 - d^3 \quad (1 < d \le 2)$$
$$= 0 \quad (2 < d)$$

For example, each pixel value in the reduced image 222 is calculated based on the above (Formula 1).

Note that during the generation processing of the reduced image 222, a pixel value for each signal of YCbCr is set for each pixel in the reduced image 222.

Further, although in the above (Formula 1) a reference pixel setting example is illustrated with n set to 4, various other settings are also possible.

Thus, in step S112, the representative pixel calculation unit 101 generates a reduced image 222 with a size of w/d×h/d, namely, a [YCbCr-8-bit-3ch-w/d×h/d image], by executing reduction processing on the YCbCr image 221, namely, a [YCbCr-8-bit-3ch-w×h image].

(Step S113)

Next, in step S113, the representative pixel calculation unit 101 generates a reduced representative pixel image 223 by performing reduced image representative pixel determination processing on the reduced image 222, namely, a [YCbCr-8-bit-3ch-w/d×h/d image].

This reduced image representative pixel determination processing is executed as the following processing.

The representative pixel calculation unit 101 executes clustering based on a K-means method (K averaging method) on the three YCbCr elements in each pixel of the reduced image 222 generated in step S112. The pixel that is the closest to the center of gravity of K number of pixels obtained as the clustering result is determined as the representative pixel position. The color information for only that representative pixel position, which in this embodiment of the present disclosure is the color difference information (Cb and Cr) is stored, and the color difference for the other pixels is set as a uniform value, Cb=Cr=128.

In step S113 illustrated in FIG. 2, the reduced representative pixel image 223 is generated by executing representative pixel determination processing on the reduced image based on such processing.

The representative pixel determination processing performed in step S113 on the reduced image will now be described in detail with reference to FIG. 4.

Figure 4:
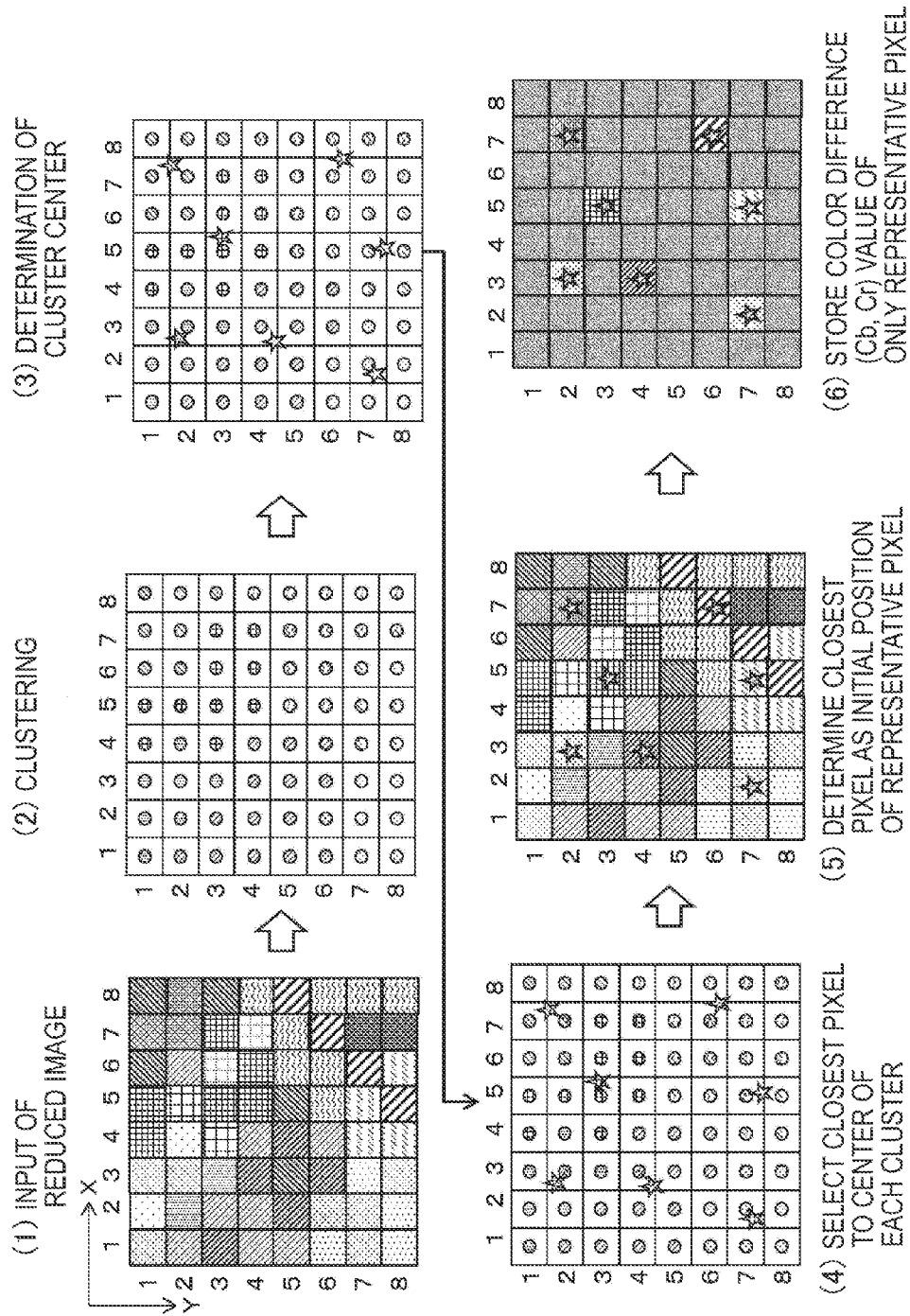
FIG. 4 is a diagram illustrating generation processing of a representative pixel image.

The representative pixel determination processing performed in step S113 on the reduced image is carried out by executing in order the processes (1) to (6) illustrated in FIG. 4.

(1) Input processing of the reduced image
(2) Clustering processing
(3) Determination processing of the center of each cluster
(4) Selection processing of the closest pixel to the center of each cluster
(5) Processing for determining the closest pixel as the representative pixel position
(6) Processing for storing color information (Cb and Cr) for only the representative pixel, and subjecting the other pixels to gray-scale processing (pixel values Y, Cb, Cr=(Y, 128, 128)

By executing these processes (1) to (6), the image illustrated in FIG. 4(6) is generated as the reduced representative pixel image 223.

Note that the clustering processing of FIG. 4(2) is carried out based on a K-means method (K averaging method). In this processing, although various values can be set for the cluster number K, here K=100, for example.

The determination processing of the center of each cluster in FIG. 4(3) is carried out by determining the center of gravity of each cluster. This is the position of the star mark in FIG. 4(3).

The selection processing of the closest pixel to the center of each cluster in FIG. 4(4) is carried out by selecting the pixel closet to the center of gravity of each cluster (the star mark as illustrated in FIG. 4(4).

The processing for determining the closest pixel as the representative pixel position in FIG. 4(5) is carried out by selecting the closest pixel to the center of gravity of each cluster. The pixel position marked with a star in FIG. 4(5) is the representative pixel.

The processing in FIG. 4(6) for storing color information (Cb and Cr) for only the representative pixel, and subjecting the other pixels to gray-scale processing (pixel values Y, Cb, Cr=(Y, 128, 128) is, as illustrated in FIG. 4(6), carried out by storing color information (Cb and Cr) for only the representative pixel (stark mark), and subjecting the other pixels to gray-scale processing (pixel values Y, Cb, Cr=(Y, 128, 128).

In step S113, the reduced representative pixel image 223, namely, a [YCbCr-8-bit-3ch-w/d×h/d image], is generated by executing representative pixel determination processing on the reduced image based on such processing.

Note that the reduced representative pixel image 223 is an image in which three pieces of pixel value information about YCbCr are set for the representative pixels, and the pixels other then the representative pixels are set having uniform color information, namely, are set as gray (Cb=128, Cr=128).
(Step S114)

Next, in step S114, the representative pixel calculation unit 101 executes color difference information generation processing corresponding to the reduced image.

Specifically, the representative pixel calculation unit 101 performs processing to determine the color difference of the pixels subjected to gray-scale processing in step S113, namely, the pixels other than the representative pixels, on the reduced representative pixel image 223, namely, a [YCbCr-8-bit-3ch-w/d×h/d image], by assuming a local linear correlation between luminance (Y) and color difference (Cb and Cr).

A specific example of the color difference information generation processing on the reduced representative pixel image 223 performed in step S114 will now be described with reference to FIG. 5.

Figure 5:
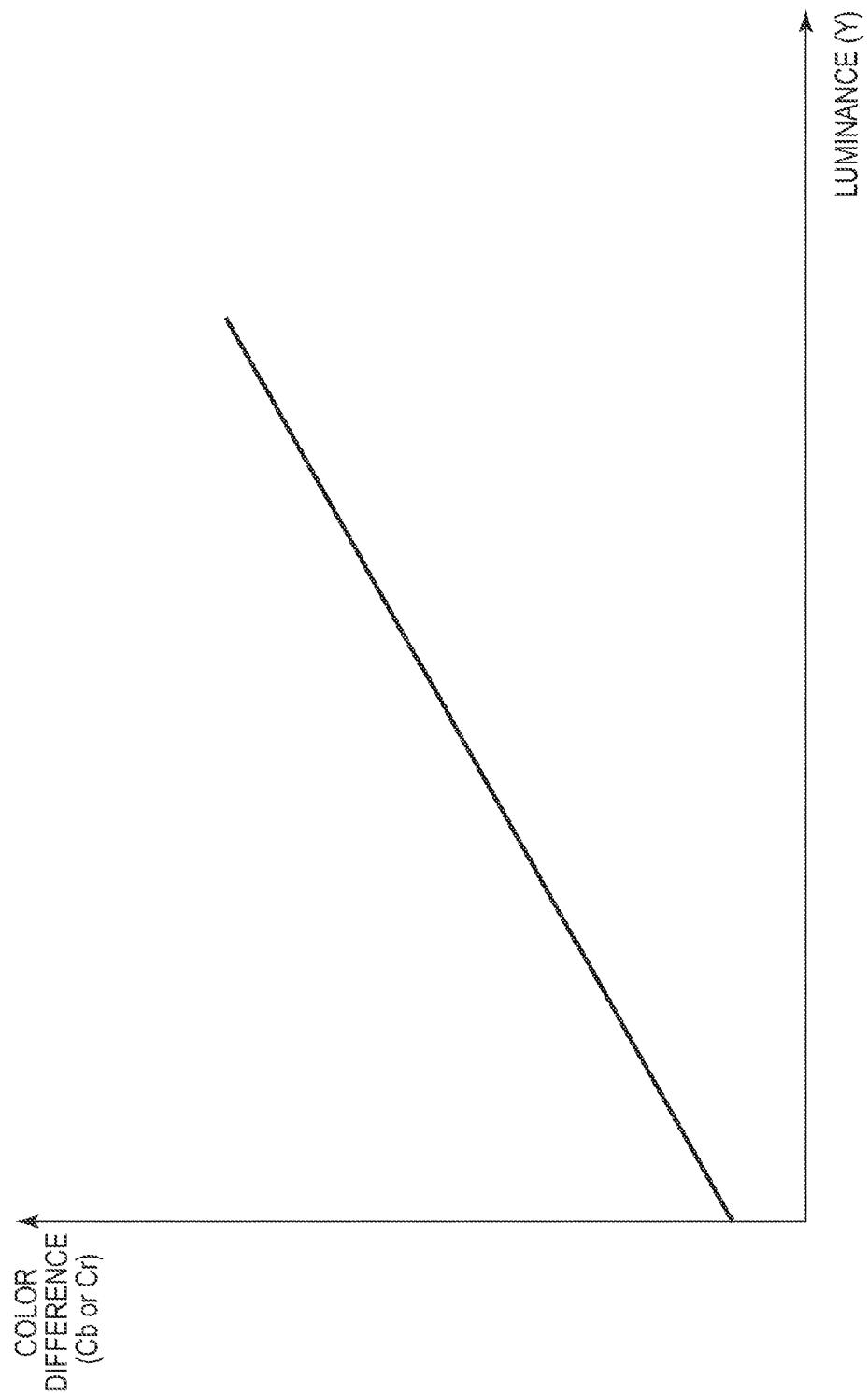
FIG. 5 is a diagram illustrating color difference information conferring processing.

The processing described with reference to FIG. 5 is color information determination processing (colorization) for determining a color difference of a pixel by assuming a local linear correlation between luminance (Y) and color difference (Cb and Cr).

In an image, as illustrated in FIG. 5, the luminance (Y) and color difference (Cb and Cr) can be assumed to have a local linear correlation.

In step S114, the color difference (Cb and Cr) of each gray pixel is determined based on the luminance (Y) of the pixels subjected to gray-scale processing in step S113 utilizing this linear correlation.

Specifically, the color difference (Cb and Cr) of each gray pixel is determined by applying the following (Formula 2) and (Formula 3).

$$\min_{cb} \sum_{y=1}^{h} \sum_{x=1}^{w} \left( cb(x,y) - \sum_{j=y-\frac{N}{2}}^{y+\frac{N}{2}} \sum_{i=x-\frac{N}{2}}^{x+\frac{N}{2}} w(Y(x,y), Y(i,j)) \times cb(i,j) \right)^2$$ (Formula 2)

$$w(Y_r, Y_s) \propto 1 + \frac{1}{\sigma^2}(Y_r - \mu)(Y_s - \mu)$$

$$\min_{cr} \sum_{y=1}^{h} \sum_{x=1}^{w} \left( cr(x,y) - \sum_{j=y-\frac{N}{2}}^{y+\frac{N}{2}} \sum_{i=x-\frac{N}{2}}^{x+\frac{N}{2}} w(Y(x,y), Y(i,j)) \times cr(i,j) \right)^2$$ (Formula 3)

$$w(Y_r, Y_s) \propto 1 + \frac{1}{\sigma^2}(Y_r - \mu)(Y_s - \mu)$$

The above (Formula 2) and (Formula 3) are formulae for calculating the gray pixels other than the representative pixels in the reduced representative pixel image 223, namely, the pixels Cb(x,y), Cr(x,y) in which the color difference information is set to Cb and Cr=(128 and 128) based on a least squares method.

N represents a nearby area (N×N) based on the assumption that luminance and color have a liner correlation. For example, a value of N=3, 5 etc. may be set.

$\sigma^2$ represents the variance of the nearby luminance values, and $\mu$ represents the mean of the nearby luminance values.

A color difference information-conferred reduced image 224 in which a calculated color difference (Cb and Cr) has been set is generated by calculating the color difference Cb(x, y) and Cr(x,y) of the pixels other than the representative pixels (Cb and Cr=128) set in step S113 based on a least squares method by applying (Formula 2) and (Formula 3).

Note that for the gray pixels set in step S113, the color difference information-conferred reduced image 224 sets the color difference calculated based on (Formula 2) and (Formula 3), and for the representative pixels other than the gray pixels, sets and outputs the pixel values (Cb and Cr) set in the reduced representative pixel image 223 generated in step S113 without change.

Based on the processing performed in step S114, the color difference information-conferred reduced image 224 is generated as a reduced image in which YCbCr pixel values including a color difference are set for all of the pixels constituting the reduced image, namely, as an output of step S114 in FIG. 2.

The color difference information-conferred reduced image 224 is an image in which the number of horizontal×vertical pixels is w/d×h/d, and YCbCr 8-bit data has been set for each pixel. Namely, the color difference information-conferred reduced image 224 is a [YCbCr-8-bit-3ch-w/d×h/d image].
(Step S115)

Next, in step S115, the representative pixel calculation unit 101 generates a representative-pixel-added reduced image 225 by executing representative pixel addition processing on the reduced image.

Specifically, the representative-pixel-added reduced image 225 is generated by inputting:

(1) the reduced image 222 generated by the reduction processing of step S112,
(2) the reduced representative pixel image 223 generated by the reduced image representative pixel determination processing of step S113, and
(3) the color difference information-conferred reduced image 224 generated by the reduced image color difference information generation processing of step S114,
applying these input images, and executing representative pixel addition processing on the reduced representative pixel image 223.

More specifically, the error between corresponding pixels between the reduced image 222 generated by the reduction processing of step S112 and the color difference information-conferred reduced image 224 generated by the reduced image color difference information generation processing of step S114 is calculated, and pixel positions having a large error are added to the reduced representative pixel image 223 generated by the reduced image representative pixel determination processing of step S113 as a new addition representative pixel position.

Based on these processes, the representative-pixel-added reduced image 225 is generated.

The processing performed in this step S115 will be described in more detail with reference to FIG. 6.

Figure 6:
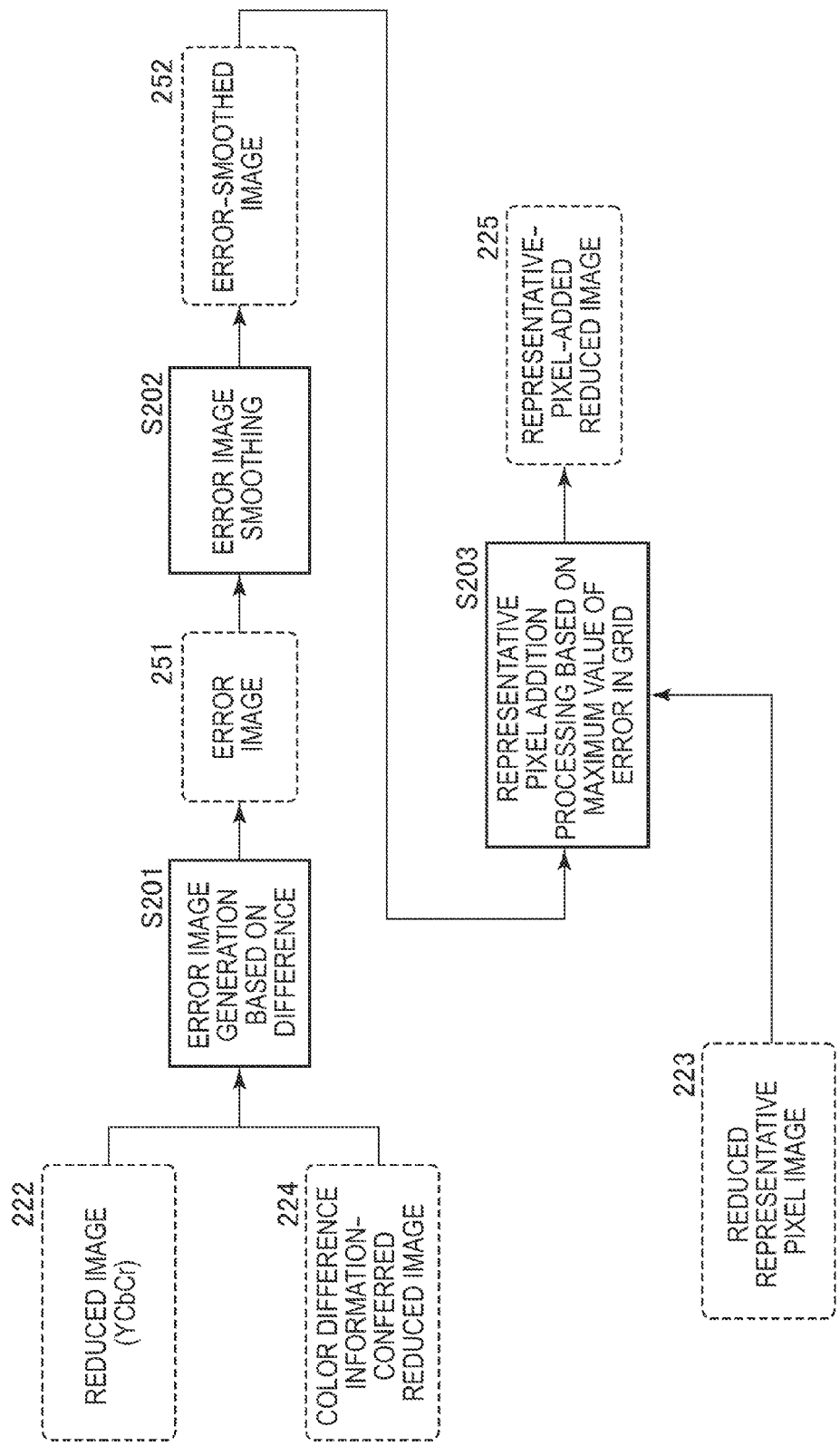
FIG. 6 is a diagram illustrating representative pixel addition processing.

In step S115, the representative-pixel-added reduced image 225 is generated by performing the processing of steps S201 to S203 illustrated in FIG. 6 by applying the above-described images (1) to (3), respectively.

First, in step S201, the following processing is executed.

The absolute value of the difference in color difference information between respective corresponding pixels between the two images of:
(a) the reduced image 222 generated by the reduction processing of step S112, and
(b) the color difference information-conferred reduced image 224 generated by the reduced image color difference information generation processing of step S114,
is calculated, and an error image 251 formed from the absolute value of the difference is generated.

The pixel value YCbCr of each pixel (x,y) in the reduced image 222 generated by the reduction processing of step S112 is set as:
$Y_{in}(x,y)$, $Cb_{in}(x,y)$, $Cr_{in}(x,y)$.

Further, the pixel value YCbCr in the color difference information-conferred reduced image 224 generated by the reduced image color difference information generation processing of step S114 is set as:
$Y_c(x,y)$, $Cb_c(x,y)$, $Cr_c(x,y)$.

At this point, the absolute value of the difference in color difference E(x,y) of each pixel is calculated based on the following (Formula 4).

$$E(x, y) = \frac{|Cb_{in}(x, y) - Cb_c(x, y)| + |Cr_{in}(x, y) - Cr_c(x, y)|}{2} \quad \text{(Formula 4)}$$

An image in which the absolute value of the difference in color difference E(x,y) calculated based on (Formula 4) is set for each pixel is generated as an error image 251. The error image 251 is an image in which an 8-bit absolute value of the difference in color difference E(x,y) is set for each pixel, namely, is an [E-8-bit-1ch-w/d×h/d image].

Next, in step S202, an error-smoothed image 252 is generated by inputting the error image 251 and performing smoothening processing on the error image 251.

The respective pixel values Esm(x,y) of the error-smoothed image 252 are calculated based on the following (Formula 5).

$$E_{sm}(x, y) = \frac{\sum_{j=y-N/2}^{y+N/2} \sum_{i=x-N/2}^{x+N/2} E(i, j) \times w_{sm}(|i - x|, |j - y|)}{\sum_{j=y-N/2}^{y+N/2} \sum_{i=x-N/2}^{x+N/2} w_{sm}(|i - x|, |j - y|)} \quad \text{(Formula 5)}$$

wherein $$w_{sm}(a, b) = \frac{1}{2\pi\sigma^2} \exp\left(-\frac{a^2 + b^2}{2\sigma^2}\right)$$

Note that in the above formula, σ represents the standard deviation of the estimated image noise, and in this case σ=1.

N represents the number of pixels in a preset nearby area (N×N pixels).

Further, σ is a parameter indicating the level of error smoothing. The greater this parameter is, the easier the image is smoothed, so that the image is less susceptible to noise. However, this can also mean that a local area color difference might not be acquired. Although this value is arbitrary, usually it set about σ=1.

Thus, in step S202, the error-smoothed image 252 is generated by inputting the error image 251 and performing smoothening processing on the error image 251.

Next, in step S203, representative pixel addition processing is executed based on a maximum error value in a grid.

The processing performed in step S203 will be described with reference to FIG. 7.

Figure 7:
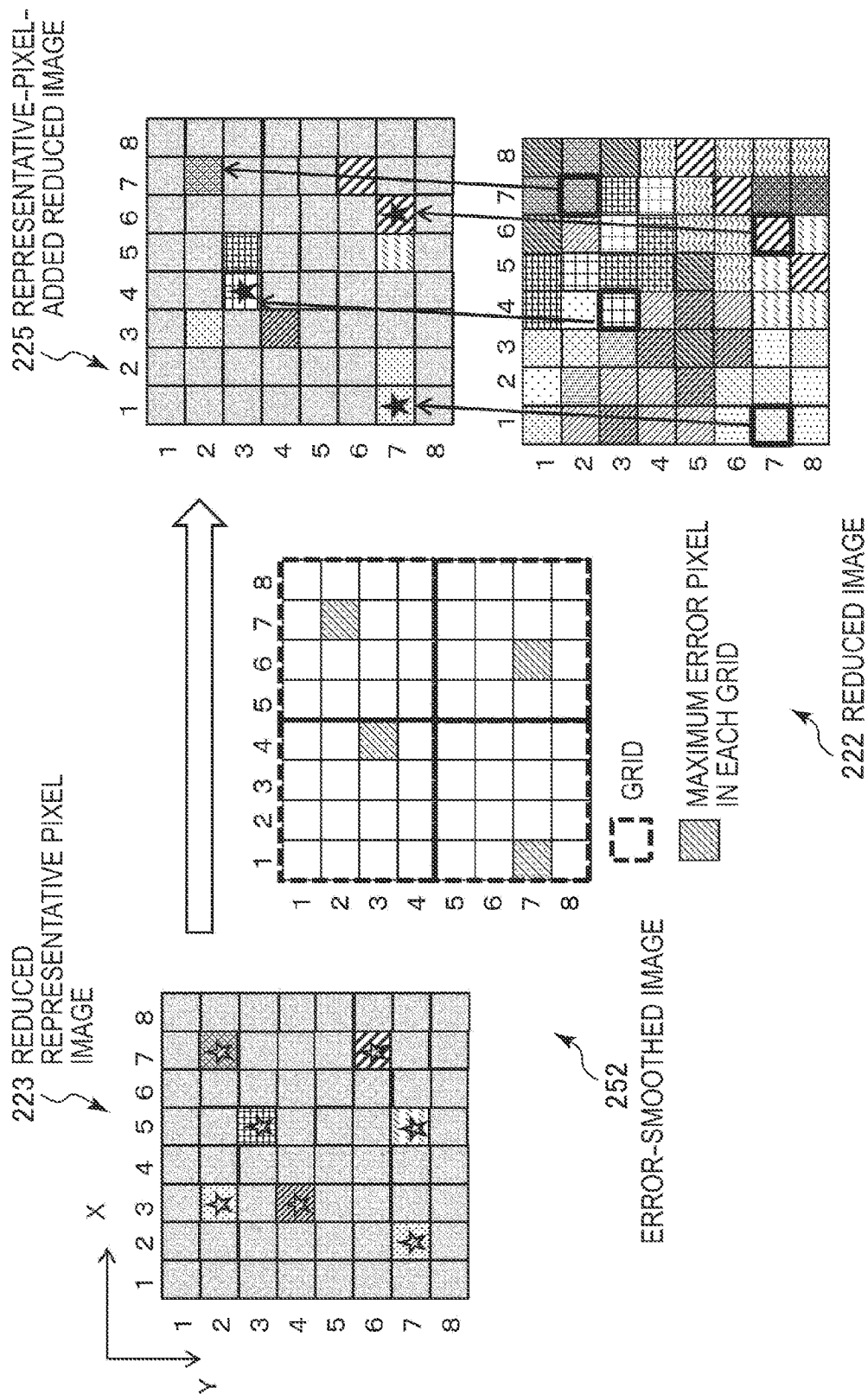
FIG. 7 is a diagram illustrating representative pixel addition processing.

In step S203, as illustrated in FIG. 7, the representative-pixel-added reduced image 225 is generated by adding a new representative pixel to the reduced representative pixel image 223 generated by the reduced image representative pixel determination processing of step S113.

First, the error-smoothed image 252 is divided into grid units that are larger than the pixels forming the image. In the example illustrated in FIG. 7, 4×4 pixels in the error-smoothed image 252 are set as one grid. The area enclosed within the dotted line in the error-smoothed image 252 illustrated in FIG. 7 is one grid.

Various settings can be set for the grid. The finer the grid is, the greater the number of pixels that are easily added as a representative pixel. However, the effects of noise also increase. Therefore, the number of pixels in the grip is set to an area of about 5 to 7 pixels, for example.

Among the error pixels in each grid, a maximum error pixel that has the maximum error pixel value is selected. The pixels indicated by the hatched lines shown in the error-smoothed image 252 in FIG. 7 are the maximum error pixels in the grid.

A determination is made whether these maximum error pixels in the grid are equal to or more than a preset threshold θ.

If a maximum error pixel is equal to or more than the preset threshold θ, the pixel in the reduced image 222 at that position is added as a representative pixel.

As illustrated in FIG. 7, the representative-pixel-added reduced image 225 is generated by adding pixels in the reduced image 222 corresponding to a pixel whose maximum error pixel in the grid is equal to or more than a preset threshold θ to the already-set representative pixels in the reduced representative pixel image 223.

The reduced image 222 is the reduced image 222 generated in step S112 of FIG. 2.

Note that various values can be set as the threshold θ value. The greater the value, the harder it is for a representative pixel to be added, while the smaller the value, the easier it is for a representative pixel to be added. θ is set at about 5, for example.

Thus, in step S115 illustrated in FIG. 2, the representative-pixel-added reduced image 225 is generated by executing the processing described with reference to FIGS. 6 and 7.
(Step S116)

Next, in step S116, the representative pixel calculation unit 101 generates an upsampled representative pixel image 226 by executing upsampling processing on the representative-pixel-added reduced image 225.

This processing returns the reduced image to its original image size.

Namely, although the processes performed in steps S113 to S115 were executed based on a reduced image, in step S116, upsampling is executed to return the representative-pixel-added reduced image 225 generated in step S115 to the image size corresponding to the original input image 120.

Namely, processing is performed that returns the image size of the (w/d)×(h/d) reduced image to w×h input image image size.

An example of the upsampling processing performed in step S116 will now be described with reference to FIG. 8.

Figure 8:
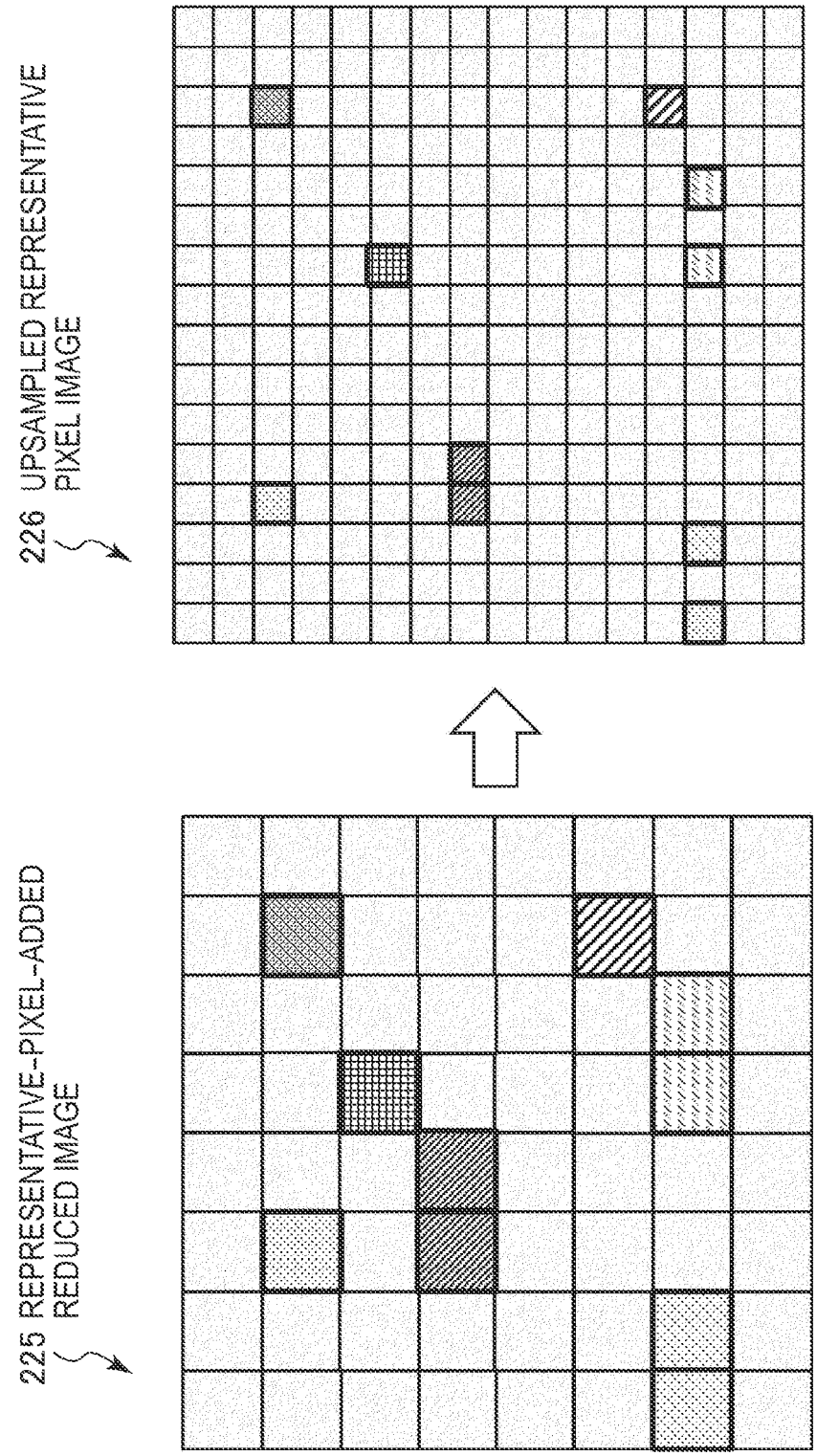
FIG. 8 is a diagram illustrating upsampling processing.

FIG. 8 illustrates:
(1) the representative-pixel-added reduced image 225 generated in step S115; and
(2) the upsampled representative pixel image 226 that is generated by upsampling processing.

Note that the pixel position of the representative pixels in the upsampled representative pixel image 226 is set so that the pixel center when enlarged is the closet pixel position to the pixel position of the representative pixels in the original representative-pixel-added reduced image 225.

The color difference of this representative pixel position is acquired from the YCbCr image 221 generated in step S111 based on the input image 120 input into the representative pixel calculation unit 101, namely, a [YCbCr-8-bit-3ch-w×h image].

This acquired image pixel (Cb and Cr) is set as the upsampled representative pixel image 226.

In step S116, the upsampled representative pixel image 226 is generated based on such processing.

(Step S117)

Next, in step S117, the representative pixel calculation unit 101 generates a color difference information-conferred image 227 by executing upsampled-image-corresponding color difference information generation processing.

This color difference information conferring processing is similar to the processing performed in step S114 described above.

However, while in step S114 the processing was carried out on a reduced image, in step S117, the processing is carried out on an upsampled image having the same size as the input image 120.

Specifically, the representative pixel calculation unit 101 performs processing to determine a color difference of the pixels subjected to gray-scale processing, namely, the pixels other than the representative pixels, on the upsampled representative pixel image 226 generated in step S116, namely, the upsampled representative pixel image 226 set with the representative pixels illustrated in FIG. 8 by assuming a local linear correlation between luminance (Y) and color difference (Cb and Cr).

This processing is the processing described with reference to FIG. 5 that is based on a local linear correlation between luminance (Y) and color difference (Cb and Cr), which is color information determination processing (colorization) for determining a color difference of a pixel based on the assumption of a local linear correlation between luminance (Y) and color difference (Cb and Cr). In an image, as illustrated in FIG. 5, the luminance (Y) and color difference (Cb and Cr) can be assumed to have a local linear correlation.

In step S117, the color difference (Cb and Cr) of each gray pixel is determined based on the luminance (Y) of the pixels subjected to gray-scale processing in step S116.

Specifically, the color difference information-conferred image 227 having the same number of pixels as the input image is generated by determining the color difference (Cb and Cr) of each gray pixel by applying the above-described following (Formula 2) and (Formula 3).

Note that for the gray pixels set in step S116, the color difference information-conferred image 227 sets the color difference calculated based on (Formula 2) and (Formula 3), and for the representative pixel other than the gray pixels, sets and outputs the pixel values (Cb and Cr) set in the upsampled representative pixel image 226 generated in step S116 without change.

Based on the processing performed in step S117, the color difference information-conferred image 227 is generated as an image in which YCbCr pixel values including a color difference are set for all of the pixels constituting the image, namely, as an output of step S117 in FIG. 2.

The color difference information-conferred image 227 is an image in which the number of horizontal×vertical pixels is w×h, and YCbCr 8-bit data has been set for each pixel.

Namely, the color difference information-conferred image 227 is a [YCbCr-8-bit-3ch-w×h image].

(Step S118)

Next, in step S118, the representative pixel calculation unit 101 generates a representative pixel added image 228 by executing representative pixel addition processing.

This representative pixel addition processing is similar to the processing performed in step S115 described above.

However, while in step S115 the processing was carried out on a reduced image, in step S118, the processing is carried out on an image having the same size as the input image 120.

Specifically, the representative pixel added image 228 is generated by inputting:

(1) the YCbCr image 221 generated by the pixel value conversion processing of step S112, (2) the upsampled representative pixel image 226 generated by the upsampling processing of step S116, and (3) the color difference information-conferred image 227 generated by the upsampled-image-corresponding color difference information generation processing of step S117, applying these input images, and executing representative pixel addition processing on the upsampled representative pixel image 226.

More specifically, the error between corresponding pixels between the YCbCr image 221 generated by the pixel value conversion processing of step S112 and the color difference corresponding information-conferred image 227 generated by the upsampled-image-corresponding color difference information generation processing of step S117 is calculated, and pixel positions having a large error are added to the upsampled representative pixel image 226 generated by the upsampling processing of step S116 as a new addition representative pixel position.

Based on these processes, the representative pixel added image 228 is generated.

The processing performed in this step S118 will be described in more detail with reference to FIG. 9.

Figure 9:
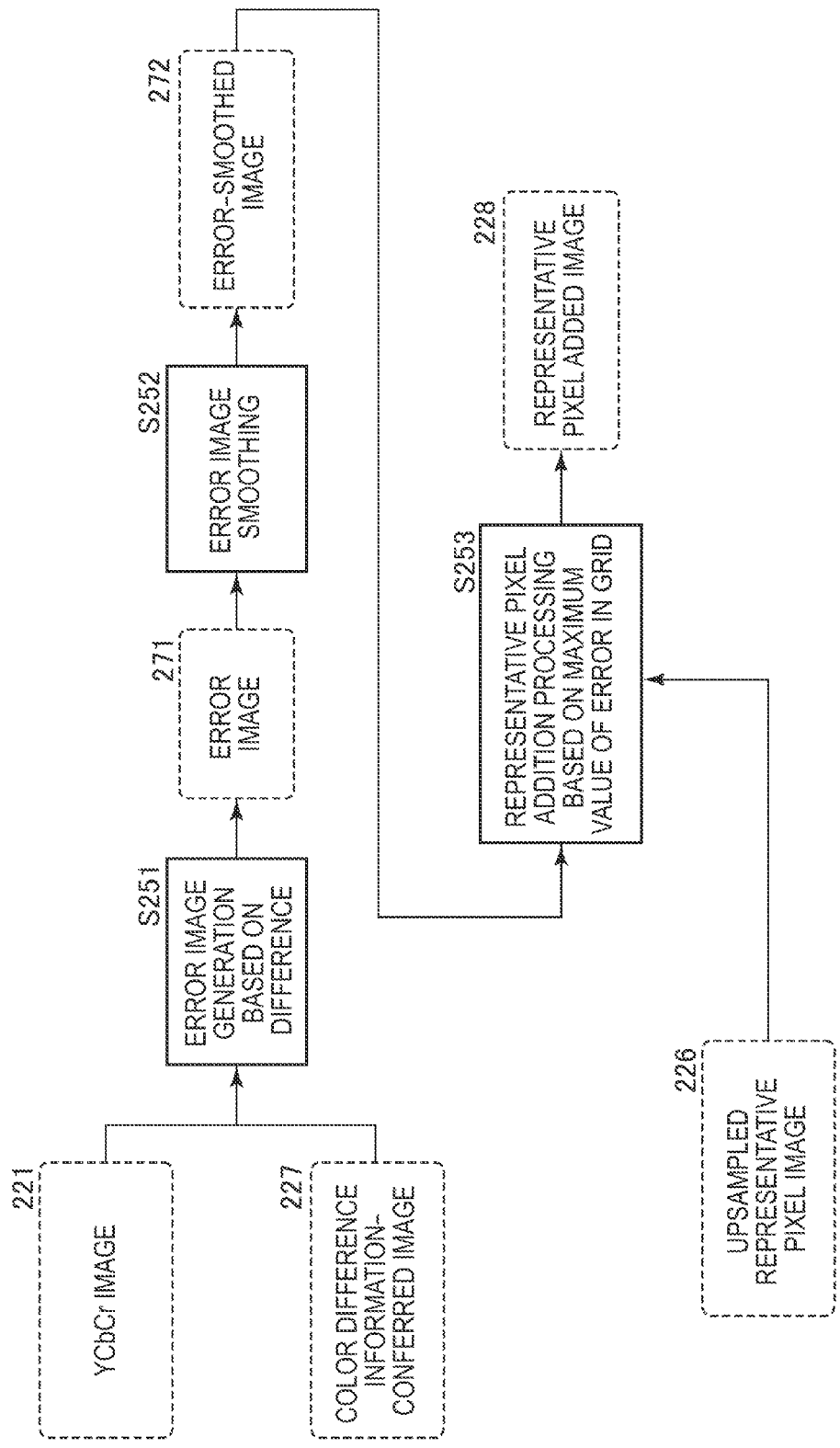
FIG. 9 is a diagram illustrating generation processing of a representative pixel added image.

The processing illustrated in FIG. 9 is similar to the processing described above with reference to FIG. 6, except that the input and output images are different.

In step S118, the representative pixel added image 228 is generated by performing the processing of steps S251 to S253 illustrated in FIG. 9 by applying the above-described images (1) to (3), respectively.

First, in step S251, the following processing is executed.

The absolute value of the difference in color difference information between respective corresponding pixels between the two images of:

(a) the YCbCr image 221 generated by the pixel value conversion processing of step S112, and (b) the color difference information-conferred image 227 generated by the upsampled-image-corresponding color difference information generation processing of step S117, is calculated, and an error image 271 formed from the absolute value of the difference is generated.

The pixel value YCbCr of each pixel (x,y) in the YCbCr image 221 generated by the pixel value conversion processing of step S111 is set as:

$Y_{in}(x,y)$, $Cb_{in}(x,y)$, $Cr_{in}(x,y)$.

Further, the pixel value YCbCr in the color difference information-conferred image 227 generated by the upsampled-image-corresponding color difference information generation processing of step S117 is set as:

$Y_c(x,y)$, $Cb_c(x,y)$, $Cr_c(x,y)$.

At this point, the absolute value of the difference in color difference $E(x,y)$ of each pixel is calculated based on the above-described (Formula 4).

An image in which the absolute value of the difference in color difference E(x,y) calculated based on (Formula 4) is set for each pixel is generated as an error image 271. The error image 271 is an image having the same pixel size (w×h) as the input image, in which an 8-bit absolute value of the difference in color difference E(x,y) is set for each pixel, namely, is an [E-8-bit-1ch-w×h image].

Next, in step S252, an error-smoothed image 272 is generated by inputting the error image 271 and performing smoothening processing on the error image 271.

The respective pixel values Esm(x,y) of the error-smoothed image 272 are calculated based on the above-described (Formula 5).

Further, as described above regarding (Formula 5), σ is a parameter indicating the level of error smoothing. The greater this parameter is, the easier the image is smoothed, so that the image is less susceptible to noise. However, this can also mean that a local area color difference might not be acquired. Although this value is arbitrary, usually it set about σ=1.

Thus, in step S252, the error-smoothed image 272 is generated by inputting the error image 271 and performing smoothening processing on the error image 271.

Next, in step S253, representative pixel addition processing is executed based on a maximum error value in a grid.

The processing performed in step S253 is similar to the processing described above with reference to FIG. 7.

However, the processing is executed by replacing the respective images illustrated in FIG. 7 as follows.

The reduced representative pixel image 223 illustrated in FIG. 7 is changed to the upsampled representative pixel image 226.

The error-smoothed image 252 illustrated in FIG. 7 is changed to the error-smoothed image 272 that is generated is step S252 of FIG. 9.

The reduced image 222 illustrated in FIG. 7 is changed to the YCbCr image 221 generated is step S111 of FIG. 2.

The representative-pixel-added reduced image 225 illustrated in FIG. 7 is changed to the representative pixel added image 228.

In step S253, based on similar processing to the processing illustrated in FIG. 7, the representative pixel added image 228 is generated by adding a new representative pixel to the upsampled representative pixel image 226 generated by the upsampling processing of step S116.

The representative pixel added image 228 is an image in which 8-bit YCbCr pixel values have been set for each pixel having the same pixel size (w×h) as the input image 120. Namely, the representative pixel added image 228 is a [YCbCr-8-bit-3ch-w×h image].

However, the Cb and Cr of the pixels other than the representative pixels are set as Cb=Cr=128, namely, are set as a pixels that have been subjected to gray-scale processing.

Thus, the representative pixel calculation unit 101 generates the representative pixel added image 228 by executing the processing illustrated in FIG. 2.

This representative pixel added image 228 is input into the representative pixel update unit 102 of the image processing unit 100 illustrated in FIG. 1.

3. Processing Executed by Representative Pixel Update Unit

Next, the processing executed by the representative pixel update unit 102 will be described.

The representative pixel update unit 102 inputs the representative pixel added image 228 generated by the representative pixel calculation unit 101, namely, an image in which 8-bit YCbCr pixel values have been set for each pixel having the same pixel size (w×h) as the input image 120, i.e., a [YCbCr-8-bit-3ch-w×h image].

This representative pixel added image 228 is an image in which unique YCBCr pixel values are set for the representative pixels, while for the pixels other than the representative pixels, luminance Y is a unique pixel value, and Cr and Cb are set to Cr=Cb=128. Namely, the representative pixel added image 228 is an image in which the pixels have been subjected to gray-scale processing.

Figure 10:
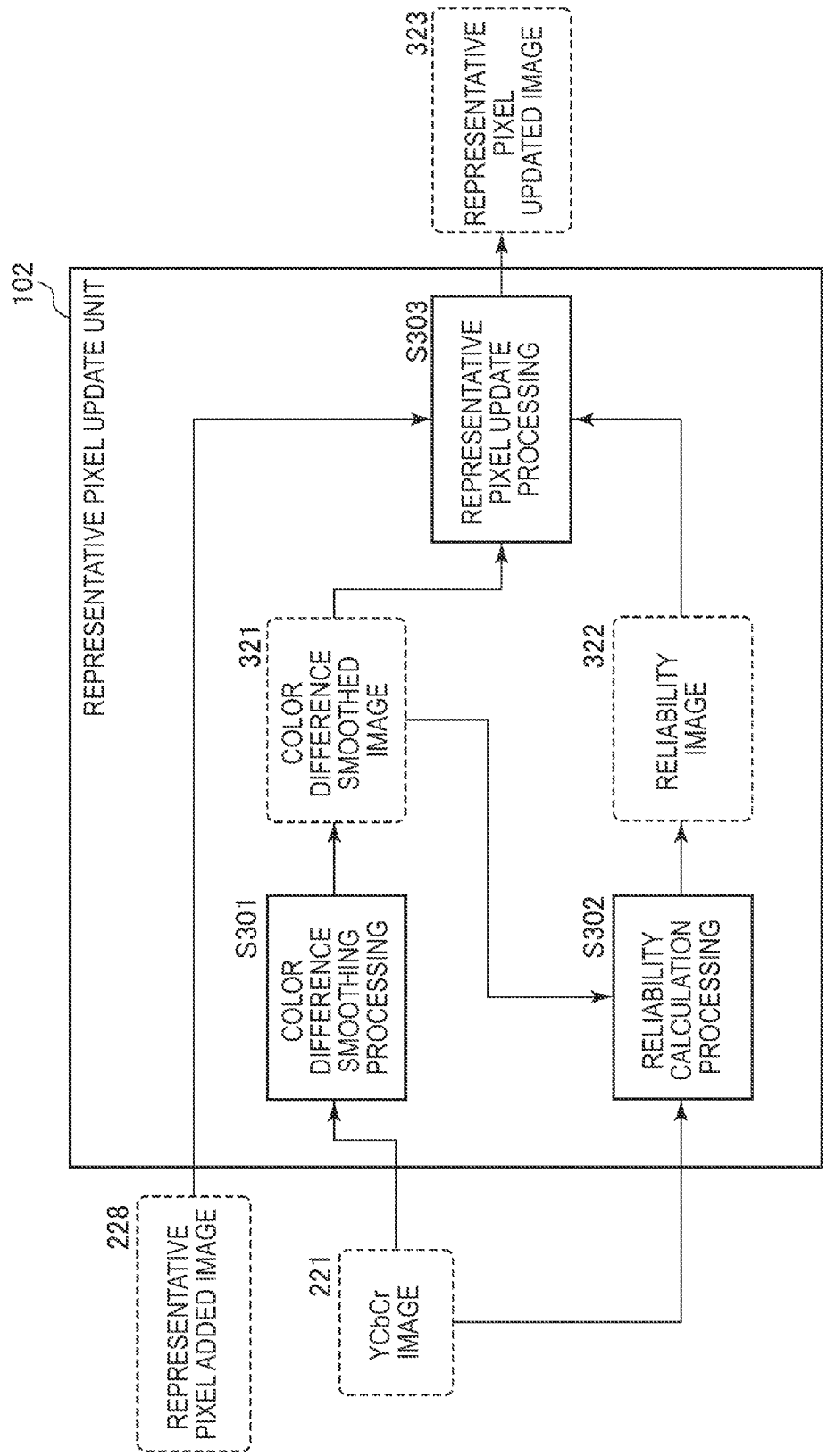
FIG. 10 is a diagram illustrating a configuration of a representative pixel update unit, and processing performed by this unit.

FIG. 10 illustrates the processing executed by the representative pixel update unit 102 in detail.

The representative pixel update unit 102 inputs the representative pixel added image 228 generated by the representative pixel calculation unit 101 and the YCbCr image 221, and outputs a representative pixel updated image 323 in which the representative pixels have been updated.

The YCbCr image 221, which is the input image, is the YCbCr image 221 generated in step S111 by the representative pixel calculation unit illustrated in FIG. 2.

The processing performed in each step by the representative pixel update unit 102 illustrated in FIG. 10 will now be described.

(Step S301)

The YCbCr image 221 is a [YCbCr-8-bit-3ch-w×h image]. The color difference smoothed image 321, in which color difference smoothed signals $Cb_{sm}(x,y)$ and $Cr_{sm}(x,y)$ have been set for each pixel (x,y), is generated by executing processing on Cb and Cr, which are color difference signals of each pixel.

The color difference signals $Cb_{sm}(x,y)$ and $Cr_{sm}(x,y)$ of each pixel are calculated based on the following (Formula 6) and (Formula 7).

$$Cb_{sm}(x,y) = \frac{\sum_{j=y-\frac{N}{2}}^{y+\frac{N}{2}} \sum_{i=x-\frac{N}{2}}^{x+\frac{N}{2}} Cb_{in}(i,j) w_{sm}(|i-x|,|j-y|)}{\sum_{j=y-\frac{N}{2}}^{y+\frac{N}{2}} \sum_{i=x-\frac{N}{2}}^{x+\frac{N}{2}} w_{sm}(|i-x|,|j-y|)}$$ (Formula 6)

wherein $$w_{sm}(a,b) = \frac{1}{2\pi\sigma^2}\exp\left(-\frac{a^2+b^2}{2\sigma^2}\right)$$

$$Cr_{sm}(x,y) = \frac{\sum_{j=y-\frac{N}{2}}^{y+\frac{N}{2}} \sum_{i=x-\frac{N}{2}}^{x+\frac{N}{2}} Cr_{in}(i,j) w_{sm}(|i-x|,|j-y|)}{\sum_{j=y-\frac{N}{2}}^{y+\frac{N}{2}} \sum_{i=x-\frac{N}{2}}^{x+\frac{N}{2}} w_{sm}(|i-x|,|j-y|)}$$ (Formula 7)

wherein $$w_{sm}(a,b) = \frac{1}{2\pi\sigma^2}\exp\left(-\frac{a^2+b^2}{2\sigma^2}\right)$$

In the above formulae, $Cb_{in}(i,j)$ represents a Cb value based on (i,j) coordinates of the YCbCr image 221, $w_{in}(a,b)$ represents a weighting function represented in terms of distance (a,b), i and j represent pixels in an N×N vicinity of x and y, and σ represents the standard deviation of the estimated image noise (if unknown, an arbitrary value, for example 1, is set example σ).

Although smoothening becomes stronger the greater σ is, blur near the edge boundaries substantially increases.
(Step S302)

In step S302, the representative pixel update unit 102 generates a reliability image 322 set having 8-bit pixel values based on reliability, in which the reliability-based pixel values are set to have a greater value the higher the reliability is, for example, by calculating the reliability of the color difference information set for each pixel of the color difference smoothed image 321 generated in step S301.

Specifically, the color difference smoothed image 321 generated in step S301 and the YCbCr image 221 are input, and the absolute value of the difference in the Cb and Cr of these two images is calculated. The smaller the absolute value of the difference, the higher the reliability of the color difference information set in color difference smoothed image 321 that is determined. Then, the reliability image 322 in which a pixel value is set based on this reliability is generated.

Figure 11:
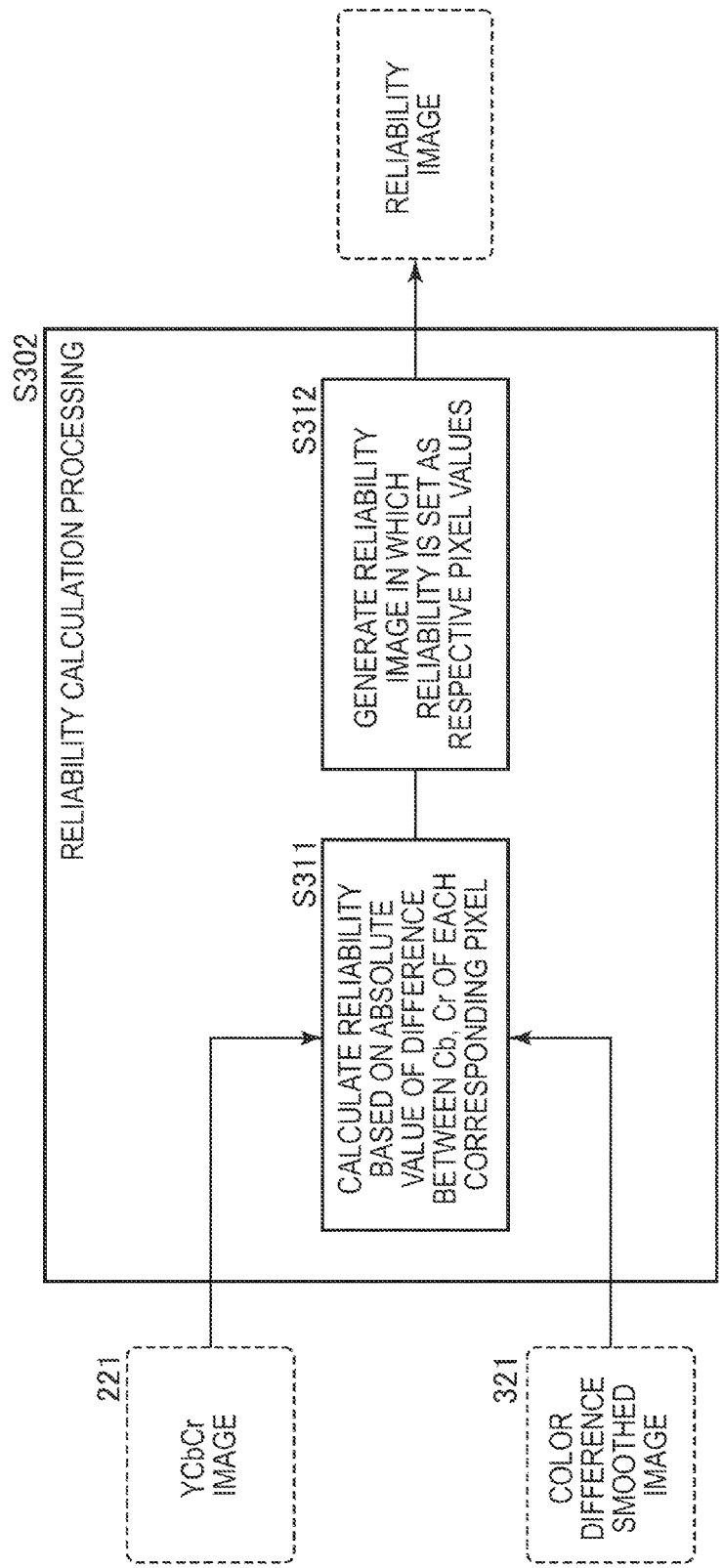
FIG. 11 is a diagram illustrating reliability calculation processing.

The reliability calculation processing performed in step S302 will now be described with reference to FIG. 11.

The color difference smoothed image 321 generated in step S301 and the YCbCr image 221 are input. Then, in step S321, a reliability M(x,y) of the color difference information set for each pixel (x,y) in the color difference smoothed image 321 is calculated according to the following (Formula 8) based on the absolute value of the difference in Cb and Cr, respectively, of the corresponding pixel between the color difference smoothed image 321 and the YCbCr image 221.

$$M(x, y) = \left( \frac{256 - |Cb_{in}(x, y) - Cb_{sm}(x, y)| \to |Cr_{in}(x, y) - Cr_{sm}(x, y)|}{2} \right)$$ (Formula 8)

In (Formula 8),
Cbin(x,y) represents the Cb value of the YCbCr image 221,
Crin(x,y) represents the Cr value of the YCbCr image 221,
Cbsm(x,y) represents the Cb value of the color difference smoothed image 321, and
Crsm(x,y) represents the Cr value of the color difference smoothed image 321.

In step S312, the reliability image 322 is generated in which the reliability M(x,y) calculated according to the above (Formula 8) has been set as a pixel value.

A pixel value M(x,y) indicating an 8-bit reliability has been set for each pixel of the reliability image 322. Namely, the reliability image 322 is generated as a [M-8-bit-1ch-w×h image].

The higher the pixel value M(x,y) of each pixel, the higher the reliability of the set pixel values $Cb_{sm}(x,y)$ and $Cr_{sm}(x,y)$ of the color difference smoothed image 321 generated in step S301 that is indicated.
(Step S303)

Next, the representative pixel update unit 102 generates the representative pixel updated image 323 by executing update processing of the representative pixel set in the representative pixel added image 228 generated by the representative pixel calculation unit 101.

Specifically, in step S303, the representative pixel updated image 323 is generated by executing update processing of the representative pixel set in the representative pixel added image 228 by applying the color difference smoothed image 321 generated in step S301 and the reliability image 322 generated in step S302.

The updated Cb and Cr values of the representative pixel set in the representative pixel updated image 323, namely, the updated pixel values $Cb_{sm}(x,y)$ and $Cr_{sm}(x,y)$ of the pixel position (x,y), are calculated based on the following (Formula 9) and (Formula 10).

$$Cb_{up}(x, y) = \frac{\sum_{j=y-N/2}^{y+N/2} \sum_{i=x-N/2}^{x+N/2} Cb_{sm}(i, j) w_{bi}(|Y(i, j) - Y(x, y)|, |i-x|, |j-y|) M(i, j) w_d(i, j)}{\sum_{j=y-N/2}^{y+N/2} \sum_{i=x-N/2}^{x+N/2} w_{bi}(|Y(i, j) - Y(x, y)|, |i-x|, |j-y|) M(i, j) w_d(i, j)}$$ (Formula 9)

wherein $$w_{bi}(l, m, n) = \frac{1}{2\sqrt{2\pi^3} \sigma^3} \exp\left(-\frac{l^2 + m^2 + n^2}{2\sigma^2}\right)$$

$$w_d(m, n) = \begin{cases} 0 & \text{if } Cb(m, n) = 128 \text{ and } Cr(m, n) = 128 \\ 1 & \text{else} \end{cases}$$

$$Cr_{up}(x, y) = \frac{\sum_{j=y-N/2}^{y+N/2} \sum_{i=x-N/2}^{x+N/2} Cr_{sm}(i, j) w_{bi}(|Y(i, j) - Y(x, y)|, |i-x|, |j-y|) M(i, j) w_d(i, j)}{\sum_{j=y-N/2}^{y+N/2} \sum_{i=x-N/2}^{x+N/2} w_{bi}(|Y(i, j) - Y(x, y)|, |i-x|, |j-y|) M(i, j) w_d(i, j)}$$ (Formula 10)

wherein $$w_{bi}(l, m, n) = \frac{1}{2\sqrt{2\pi^3} \sigma^3} \exp\left(-\frac{l^2 + m^2 + n^2}{2\sigma^2}\right)$$

$$w_d(m, n) = \begin{cases} 0 & \text{if } Cb(m, n) = 128 \text{ and } Cr(m, n) = 128 \\ 1 & \text{else} \end{cases}$$

In (Formula 9) and (Formula 10),
(i,j) represents a pixel position in a nearby (N×N pixels) area of the update-target pixel position (x,y),
$Cb_{sm}(x,y)$ and $Cr_{sm}(x,y)$ represent the Cb and Cr pixel of the color difference smoothed image 321,
σ represents the standard deviation of the estimated noise amount of the image (if unknown, σ is set as 1),
$w_d(m,n)$ represents a function for determining whether a coordinate (m,n) is a representative pixel, with representative pixels set as 1 and other pixels set as 0,
$w_{bi}(l,m,n)$ represents a preset weighting to be applied in the update processing,
l represents a luminance difference between representative pixels, and
m and n represent the spatial distance between representative pixels.

The greater the difference in the luminance value between representative pixels, and the greater (further away) the spatial distance between representative pixels, the smaller the weighting that is set for $w_{bi}(l,m,n)$.

Further, the higher the reliability M(i,j) at the coordinate (i,j), the higher the ratio of a heavier weighting.

This is to reduce the ratio used in updating because, as a result of the smoothening of the color difference of the representative pixels at a position near the edges, there is a large chance that the colors of $Cb_{sm}$ and $Cr_{sm}$ may be mixed.

Thus, the representative pixel update unit 102 updates the pixel values of the representative pixels by performing a correction according to a predetermined algorithm on the pixel values of the representative pixels set by the representative pixel calculation unit 101.

The processing according to (Formula 9) and (Formula 10) calculates, specifically, updated pixel values $Cb_{up}(x,y)$ and $Cr_{up}(x,y)$ of the representative pixels based on the setting of (N×N pixels) around the position corresponding to the representative pixels of the color difference smoothed image 321 of the YCbCr image 221 as reference pixels, and applying the pixel values of these reference pixels.

During this representative pixel pixel value update processing, the greater the difference between the pixel values of the representative pixels and the luminance value of the reference pixels, and the greater (further away) the spatial distance between the representative pixels and the reference pixels, the smaller the set weighting for adjusting the contribution ratio of the pixel value of the reference pixels.

Further, the contribution ratio of the reference pixel pixel value is changed based on the reliability M(x,y) of the color difference information set for each pixel (x,y) in the color difference smoothed image 321.

In step S303, updated pixel values $Cb_{up}(x,y)$ and $Cr_{up}(x,y)$ of the representative pixels are calculated based on (Formula 9) and (Formula 10), and the representative pixel updated image 323 in which updated pixel values $Cb_{up}(x,y)$ and $Cr_{up}(x,y)$ are set as pixel values is generated.

The representative pixel update unit 102 generates the representative pixel updated image 323 in this manner, and outputs the generated representative pixel updated image 323 to the corrected image generation unit 103.

The representative pixel updated image 323 generated by the representative pixel update unit 102 is an image in which 8-bit YCbCr pixel values have been set for each pixel having the same pixel size (w×h) as the input image 120. Namely, the representative pixel updated image 323 is a [YCbCr-8-bit-3ch-w×h image].

However, the Cb and Cr of the pixels other than the representative pixel are set as Cb=Cr=128, namely, are set as a pixels that have been subjected to gray-scale processing.

4. Processing Executed by Corrected Image Generation Unit

Next, the processing performed by the corrected image generation unit 103 of the image processing unit 100 at the final stage will now be described with reference to FIG. 12. The processing performed in each step illustrated in FIG. 12 will now be described in order.

(Step S321)

Figure 12:
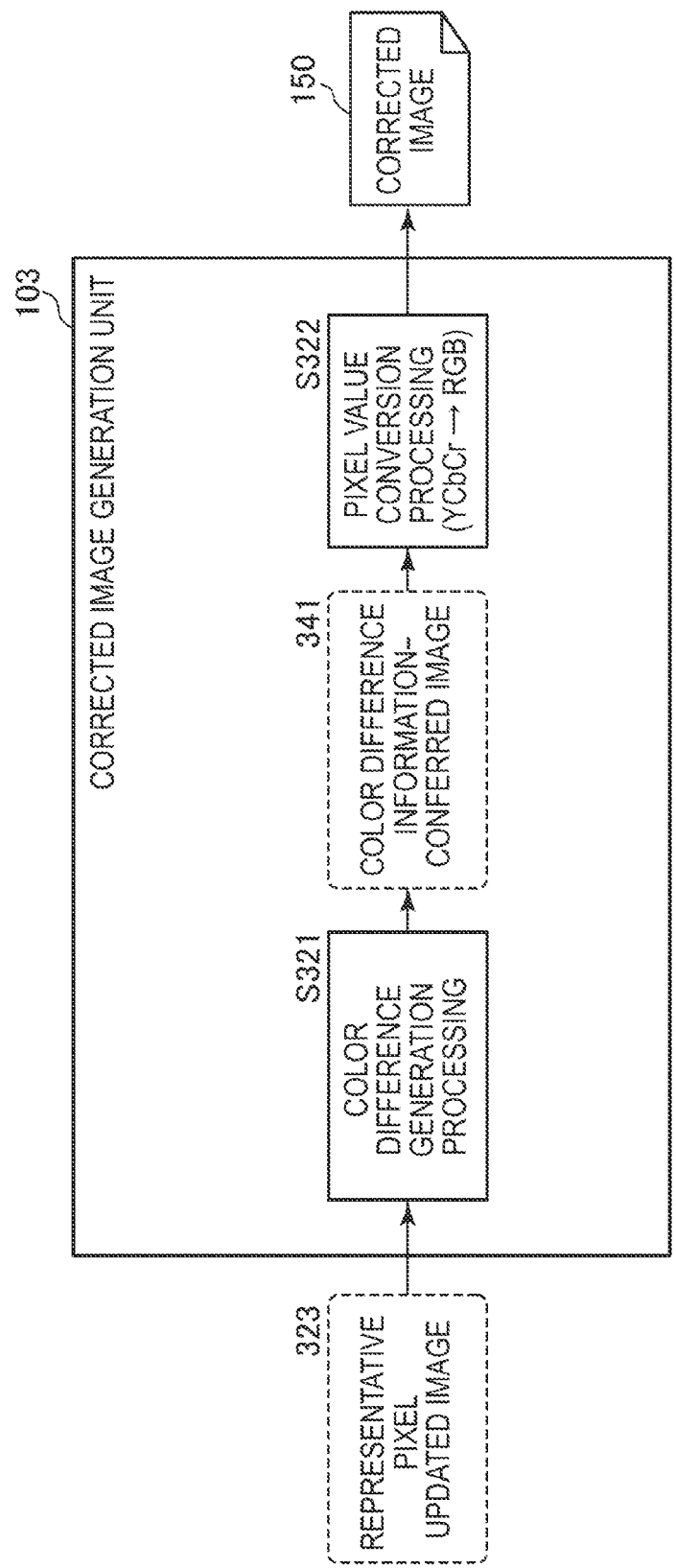
FIG. 12 is a diagram illustrating a configuration of a corrected image generation unit, and processing performed by this unit.

As illustrated in FIG. 12, the corrected image generation unit 103 generates a color difference information-conferred image 341 by inputting the representative pixel updated image 323 generated by the representative pixel update unit 102 in step S321, executing color difference information generation processing (colorization) in which the representative pixel updated image 323 is applied, and setting color difference information Cb and Cr in the pixels other than the representative pixels in the representative pixel updated image 323 that have been subjected to gray-scale processing.

This color difference information generation processing performed in step S321 is similar to the processing performed in steps S114 and S117 described as processing performed by the representative pixel calculation unit 101 illustrated in FIG. 2.

Specifically, processing is performed to determine a color difference of the pixels subjected to gray-scale processing, namely, the pixels other than the representative pixels, on the representative pixel updated image 323 generated by the representative pixel update unit 102 in step S321, by assuming a local linear correlation between luminance (Y) and color difference (Cb and Cr).

This processing is the processing described with reference to FIG. 5 that is based on a local linear correlation between luminance (Y) and color difference (Cb,Cr), which is color information determination processing (colorization) for determining a color difference of a pixel based on the assumption of a local linear correlation between luminance (Y) and color difference (Cb and Cr). In an image, as illustrated in FIG. 5, the luminance (Y) and color difference (Cb and Cr) can be assumed to have a local linear correlation.

In step S321, the color difference (Cb and Cr) of each gray pixel is determined based on the luminance (Y) of the pixels subjected to gray-scale processing in the representative pixel updated image 323 generated by the representative pixel update unit 102 utilizing this linear correlation.

Specifically, the color difference information-conferred image 341 having the same number of pixels as the input image is generated by determining the color difference (Cb and Cr) of each gray pixel by applying (Formula 2) and (Formula 3) that were described above.

Note that for the gray pixels, the color difference information-conferred image 341 sets the color difference calculated based on the above-described (Formula 2) and (Formula 3), and for the representative pixels other than the gray pixels, sets and outputs the pixel values (Cb and Cr) set in the representative pixel updated image 323 without change.

Based on the processing performed in step S321, the color difference information-conferred image 341 is generated as an image in which YCbCr pixel values including a color difference are set for all of the pixels constituting the image, namely, as an output of step S321 in FIG. 12.

The color difference information-conferred image 341 is an image in which the number of horizontal×vertical pixels is w×h, and YCbCr 8-bit data has been set for each pixel. Namely, the color difference information-conferred image 227 is a [YCbCr-8-bit-3ch-w×h image].

(Step S322)

Next, in step S322, the corrected image generation unit 103 executes pixel value conversion processing of the color difference information-conferred image generated in step S321.

Specifically, the corrected image generation unit 103 converts the YCbCr pixel values into RGB pixel values, and generates and outputs a corrected image 150 in which these pixel values have been set.

The YCbCr→RGN conversion processing is carried out by applying the following formulae.

$R = Y + 1.403 \times (Cr - 128)$ $G = Y - 0.344 \times (Cr - 128) - 0.714 \times (Cb - 128)$ $B = Y + 1.773 \times (Cb - 128)$ Based on the above processing, a corrected image 150 in which RGB pixel values have been set is obtained.

Thus, in the image correction processing according to the first embodiment of the present disclosure, a representative pixel calculated by a representative pixel calculation unit is updated by a representative pixel update unit, and then color information setting processing is carried out using the pixel values of the updated representative pixel, namely the color difference information (Cb and Cr) setting according to this embodiment of the present disclosure is executed.

The representative pixel update unit 102 updates the pixel values of the representative pixels by generating a color difference smoothed image of a YCbCr image, and based on the pixels (N×N pixels) around a representative pixel corresponding position of the generated color difference smoothed image as reference pixels, applying the pixel values of the reference pixels.

During this representative pixel pixel value update processing, the greater the difference between the pixel values of the representative pixels and the luminance value of the reference pixels, and the greater (further away) the spatial distance between the representative pixels and the reference pixels, the smaller the weighting for adjusting the contribution ratio of the pixel values of the reference pixels.

Further, the contribution ratio of the pixel values of the reference pixels is changed based on the reliability M(x,y) of the color difference information set for each pixel (x,y) in the color difference smoothed image.

Specifically, the representative pixel update is performed by applying the above-described (Formula 9) and (Formula 10).

Based on this representative pixel update processing, representative pixel values in which the influence of noise is reduced can be set. Consequently, color information is set in the pixels other then the representative pixels that is based on the pixel values of representative pixels in which the influence of noise is reduced, thus enabling a high-quality image to be generated in which noise in the overall image has been effectively removed.

5. Other Embodiments of the Present Disclosure

In the embodiment of the present disclosure described above, an example of a configuration of processing for reducing chroma noise that mainly occurs in an image was described.

However, the processing that can be executed based on the configuration according to the present disclosure is not limited to chroma noise reduction. For example, image gradation correction can be performed by configuring so that the elements stored by the representative pixels in the embodiment of the present disclosure described above are the "DC component, variation, and position of luminance (Y)", and the representative pixel update unit execute gradation correction processing of the representative pixels.

Further, false color and storage color correction can also be carried out by performing coordinate conversion processing, rather than weighted addition processing, with the representative pixel update unit.

Even in embodiments of the present disclosure that perform such processing, by updating the pixel values (=elements) of the initially-set representative pixels in the same manner as the embodiment of the present disclosure described above, a high-quality image can be generated according to the intended purpose in which the influence of noise and external disturbances has been reduced.

These embodiments of the present disclosure will now be described.

[5-1. Embodiment in which Gradation Correction is Performed]

An embodiment according to the present disclosure of an image processing apparatus that performs gradation processing will now be described as a second embodiment of the present disclosure with reference to FIG. 13 onwards.

Figure 13:
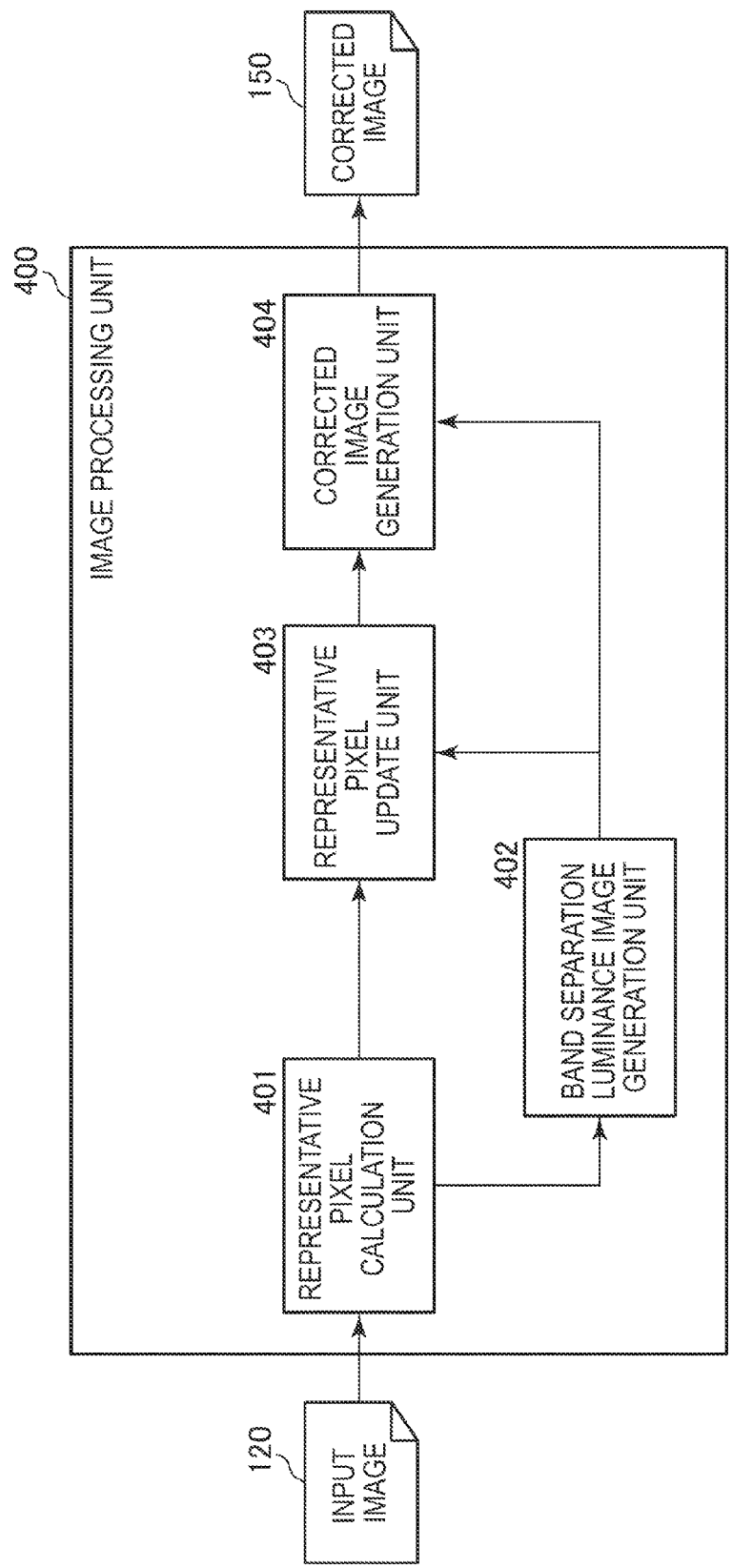
FIG. 13 is a diagram illustrating a configuration of an image processing apparatus according to a second embodiment of the present disclosure, and processing performed by this apparatus.

FIG. 13 illustrates a configuration of an image processing unit 400 in an image processing apparatus according to this embodiment of the present disclosure.

Similar to the image processing apparatus according to the embodiment of the present disclosure described above, the image processing apparatus according to this embodiment of the present disclosure can be specifically realized by various apparatuses, such as an imaging apparatus like a camera that captures images, or an information processing apparatus like a PC that reads an image from a recording medium on which an image is recorded and executes processing.

FIG. 13 is a block diagram illustrating the main configuration of an image processing unit 400 that executes gradation correction in the image processing apparatus according to this embodiment of the present disclosure.

The image processing unit 400 inputs an input image 120, which is an image on which gradation correction processing is to be performed, and outputs a corrected image 150 on which gradation correction was executed.

The image processing unit 400 illustrated in FIG. 13 includes, for example, a DSP (digital signal processor) in the imaging apparatus. Alternatively, the image processing unit 100 can be configured in an image processing apparatus such as a PC that executes processing based on a program that prescribes the image processing according to the present disclosure.

As illustrated in FIG. 13, the image processing unit 400 includes a representative pixel calculation unit 401, a band separation luminance image generation unit 402, a representative pixel update unit 403, and a corrected image generation unit 404.

The processing executed by each of the configuration units will now be described in order.

(5-1-1. Processing Performed by the Representative Pixel Calculation Unit)

The processing performed by the representative pixel calculation unit 401 will be described with reference to FIG. 14.

Figure 14:
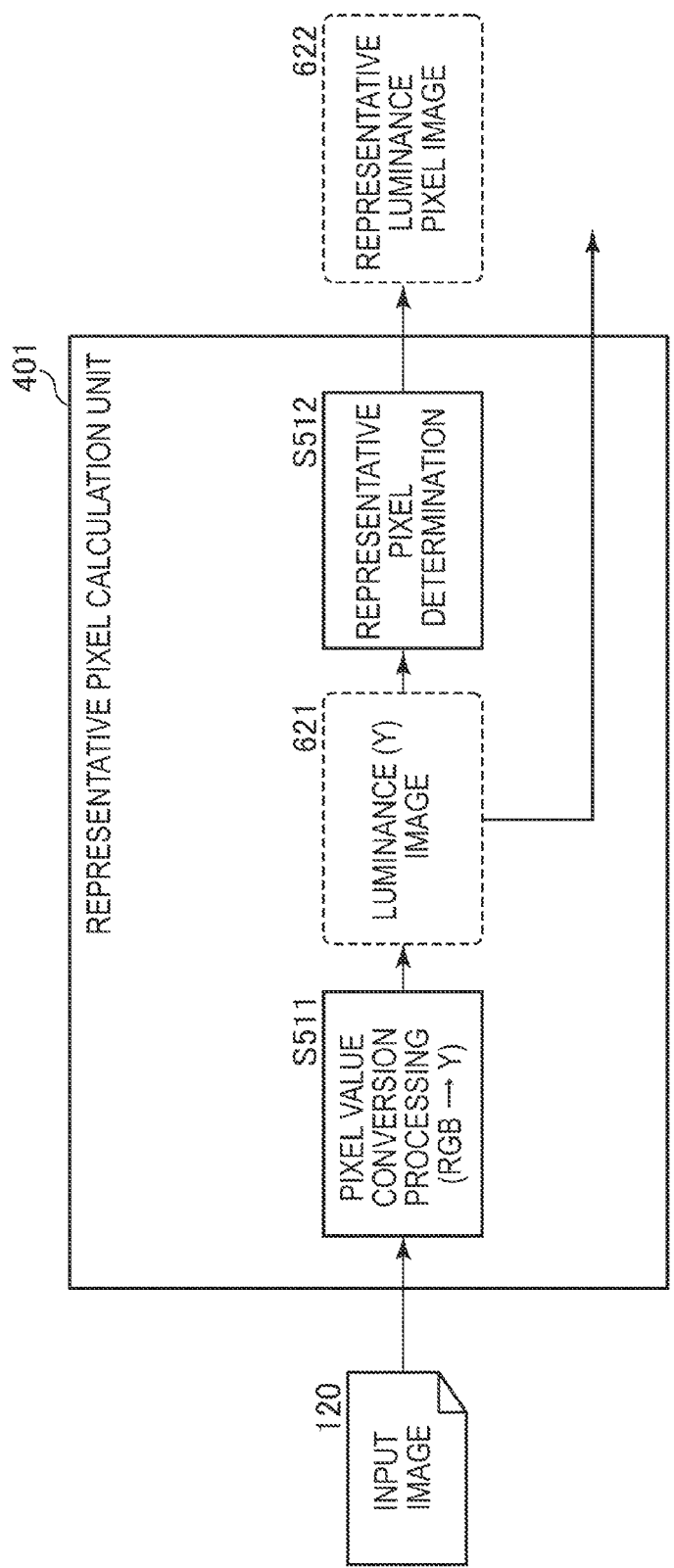
FIG. 14 is a diagram illustrating a configuration of a representative pixel calculation unit according to a second embodiment of the present disclosure, and processing performed by this unit.

As illustrated in FIG. 14, in step S511, the representative pixel calculation unit 401, first, inputs an input image 120 in which RGB pixel values are set for each pixel, and executes conversion processing of the pixel values set for each pixel in the input image 120.

The pixel value conversion processing performed in this embodiment of the present disclosure is processing for generating a luminance (Y) image 621 in which only a luminance value (Y) is set for each pixel in the input image in which RGB pixel values are set for each pixel.

Specifically, the luminance (Y) image 621 is generated by performing RGB→Y conversion (luminance image generation).

The calculation processing of the luminance value (Y) from the RGB pixel values is executed based on the following formula.

$$Y=0.299 \times R+0.587 \times G+0.144 \times B$$

Next, in step S512, the representative pixel calculation unit 401 executes representative pixel determination processing.

First, blocks formed from a pixel area larger than the pixel units is set in the luminance image 621, and average luminance and variation in block units are determined.

In addition, the pixel having the center coordinate of each block is set as a representative pixel, and a flag=1 is set for the representative pixels. For the other pixels, namely, the pixels other than the representative pixels, a flag=0 is set.

In step S512, based on such processing, a representative luminance pixel image 622 is generated in which three signal values (average luminance, luminance variation, flag) are set as pixel values in each pixel of the image 621.

Note that various settings are possible for the block size. For example, 5×5 pixel blocks may be applied.

(5-1-2. Processing Performed by the Band Separation Luminance Image Generation Unit)

Next, the processing performed by the band separation luminance image generation unit 402 in the image processing unit 400 illustrated in FIG. 13 will be described.

The processing performed by the band separation luminance image generation unit 402 will be described with reference to FIG. 15.

The band separation luminance image generation unit 402 inputs:

(1) the luminance image 621, and (2) the representative luminance pixel image 622 generated by the representative pixel calculation unit 401.

The luminance image 621 is an image in which only a luminance (Y) signal is set for each pixel, namely, is a [Y-8-bit-1ch-w×h image].

The representative luminance pixel image 622 is an image in which three signal values (average luminance, luminance variation, flag) are set for each pixel, namely, is an [average luminance, luminance variation, flag-n-bit-3ch-w×h image].

Note that the respective bit value for each signal (average luminance, luminance variation, and flag) is represented as n-bits, because a different bit value can be set for each of the signals.

Figure 15:
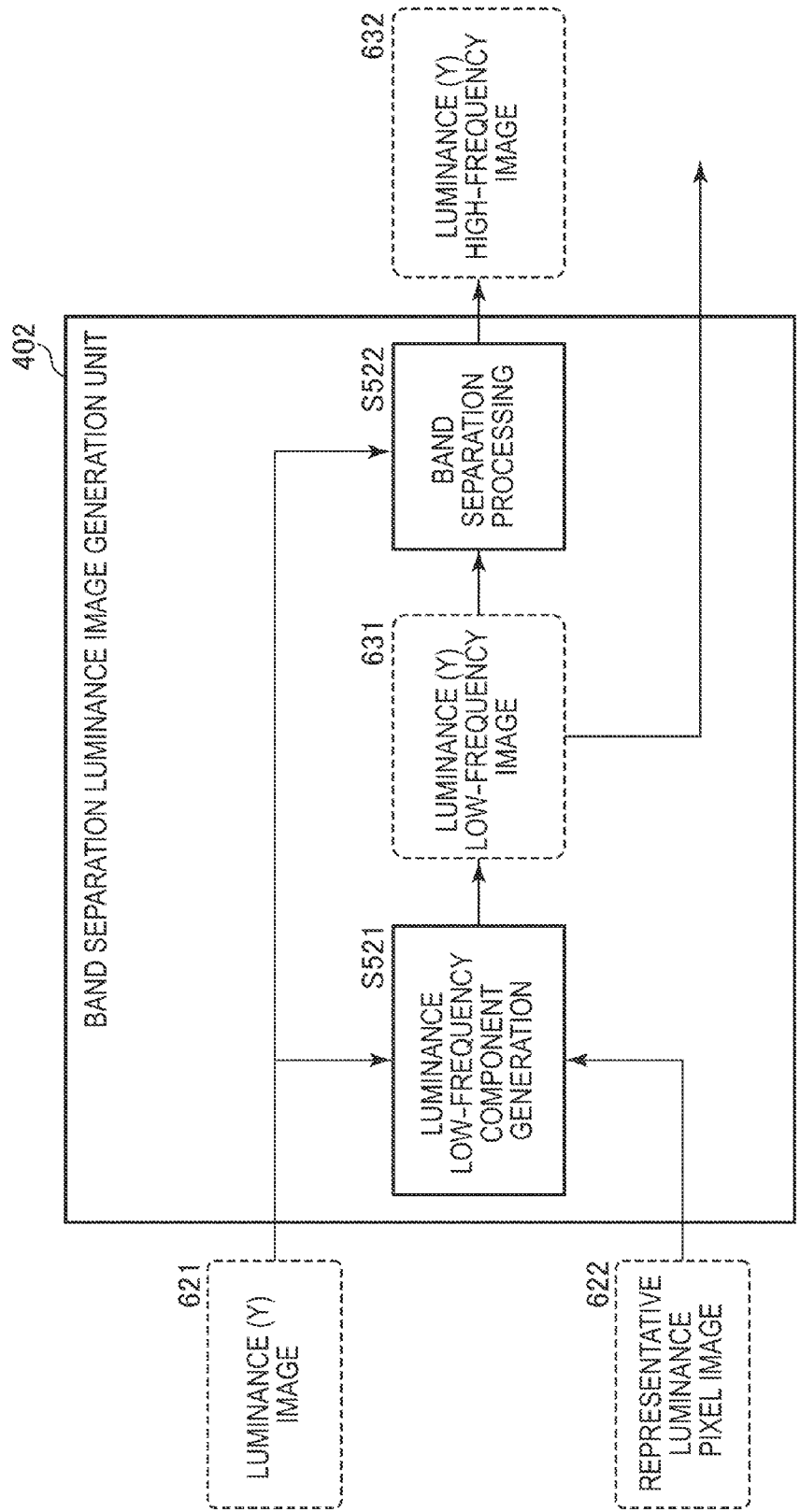
FIG. 15 is a diagram illustrating a configuration of a band separation luminance image generation unit, and processing performed by this unit.

In step S521 illustrated in FIG. 15, a luminance (Y) low-frequency image 631 is generated utilizing the luminance image 621, in which only a luminance (Y) signal is set for each pixel, namely, a [Y-8-bit-1ch-w×h image], and the representative luminance pixel image 622 in which three signal values (average luminance, luminance variation, flag) are set for each pixel, namely, an [average luminance, luminance variation, flag-n-bit-3ch-w×h image].

Specifically, the following processing is performed.

The luminance (Y) low-frequency image 631 in which a low-frequency luminance value $Y_{low}(x,y)$ has been set for each pixel is generated by calculating a tone curve determined from the average luminance and the luminance variation of the representative pixels using both the average luminance and luminance variation information set in the representative pixels of the representative luminance pixel image 622, and executing smoothening processing on the luminance value $Y(x,y)$ set for each pixel of the image 621 based on the tone curve.

The low-frequency luminance value $Y_{low}(x,y)$ set for each pixel of the luminance (Y) low-frequency image 631 is calculated according to the following (Formula 11).

$$Y_{low}(x, y) = Y(x, y) \times \alpha + \mu \times (1 - \alpha) \quad \text{(Formula 11)}$$

$$\alpha = \frac{\sigma^2}{\sigma_n^2 + \sigma^2}$$

Note that in (Formula 11), $\mu$ represents the average luminance of the closest representative pixel of each pixel, $\sigma^2$ represents the luminance value variance of the representative pixels, and $\sigma_n^2$ represents the variance of the estimated noise (if unknown, this value is set as 1).

In step S521 illustrated in FIG. 15, the luminance (Y) low-frequency image 631 in which a low-frequency luminance value $Y_{low}(x,y)$ has been set for each pixel is generated based on the above-described processing.

In addition, in step S522 illustrated in FIG. 15, the band separation luminance image generation unit 402 inputs the luminance image 621 and the luminance (Y) low-frequency image 631, and generates a high-frequency image 632 based on these images.

Specifically, the band separation luminance image generation unit 402 calculates the luminance high-frequency image 632, namely, the pixel value $Y_{high}(x,y)$ of the high-frequency image 632 based on the following (Formula 12) by performing band separation for executing subtraction processing of the corresponding pixel to the luminance low-frequency image 631 formed from a luminance low-frequency component, namely, a [low-frequency Y-8-bit-1ch-x×y image], from the luminance image 621 formed from a luminance value, namely, a [Y-8-bit-1ch-x×y image].

$$Y_{high}(x,y) = Y(x,y) - Y_{low}(x,y) \quad \text{(Formula 12)}$$

In (Formula 12), $Y(x,y)$ is the pixel value (=luminance value) at the pixel position (x,y) of the luminance image 621, and $Y_{low}(x,y)$ is the pixel value (=low-frequency luminance value) at the pixel position (x,y) of the luminance low-frequency image 631.

Thus, in step S522 illustrated in FIG. 15, the band separation luminance image generation unit 402 inputs the luminance image 621 and the luminance (Y) low-frequency image 631, and based on these images generates the luminance high-frequency image 632 in which the above high-frequency component has been set as a pixel value, namely, a [high-frequency Y-8-bit-1ch-w×h image].

(5-1-3. Processing Performed by the Representative Pixel Update Unit)

Next, the processing performed by the representative pixel update unit 403 in the image processing unit 400 illustrated in FIG. 13 will be described.

The representative pixel update unit 403 inputs:

(1) the representative luminance pixel image 622 generated by the representative pixel calculation unit 401.

The representative pixel update unit 403 inputs the representative luminance pixel image 622 in which three signal values (average luminance, luminance variation, flag) are set for each pixel generated by the representative pixel calculation unit 401, namely, [average luminance, luminance variation, flag-n-bit-3ch-w×h image].

Figure 16:
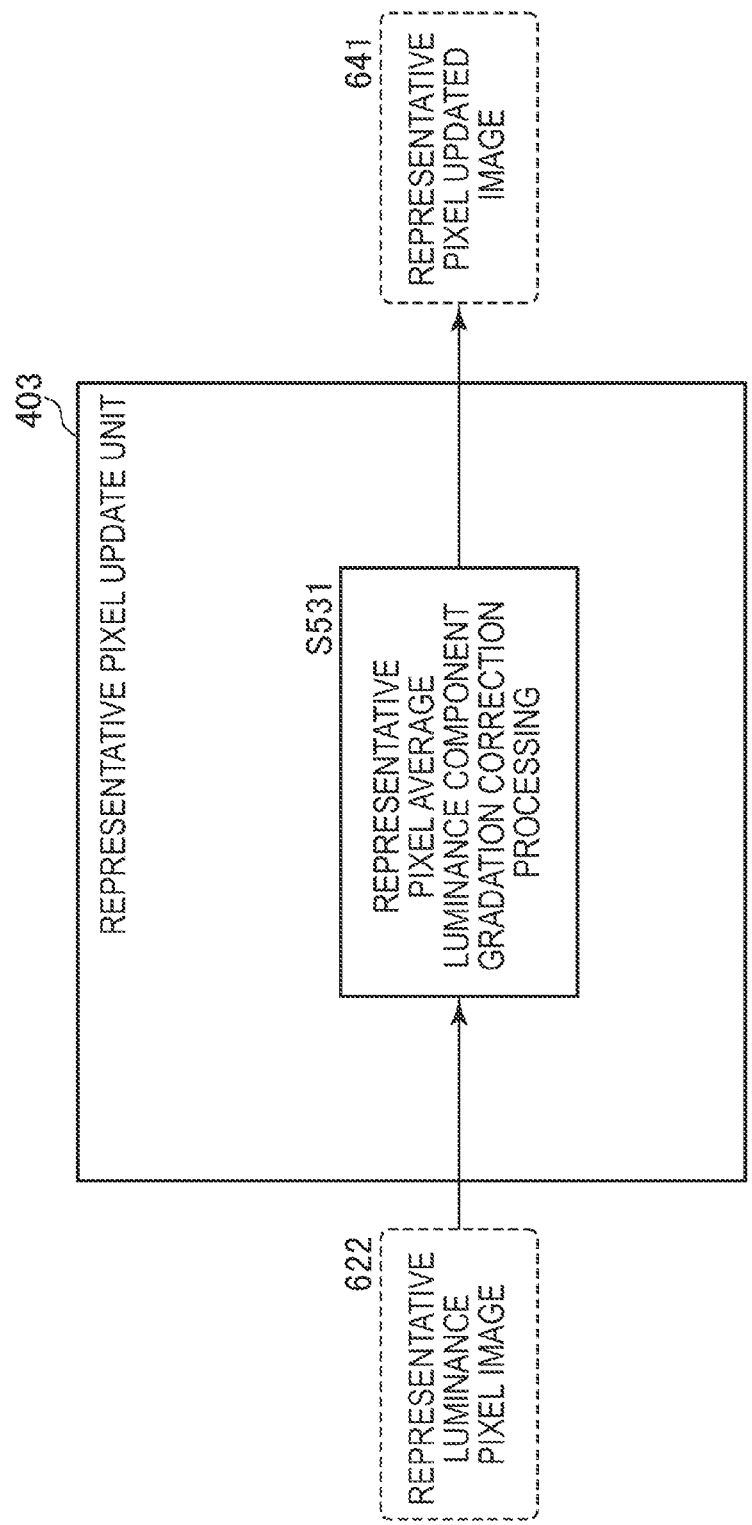
FIG. 16 is a diagram illustrating a configuration of a representative pixel update unit, and processing performed by this unit.

In step S531 illustrated in FIG. 16, the representative pixel update unit 403 generates a representative pixel updated image 641 by performing gradation correction of the average luminance component set in each representative pixel of the above representative luminance pixel image 622, namely, an [average luminance, luminance variation, flag-n-bit-3ch-w×h image].

Note that this representative pixel updated image 641 is also, similar to the representative luminance pixel image 622, an image in which three signal values (average luminance, luminance variation, flag) are set for each pixel, namely, is an [average luminance, luminance variation, flag-n-bit-3ch-w×h image].

However, this is an image in which gradation correction of the average luminance component set in each representative pixel has been executed.

Although there are various methods for performing gradation correction of the average luminance component, for example, gradation correction based on histogram extension can be applied.

An example of gradation correction processing based on histogram extension will now be described with reference to FIG. 17.

Figure 17:
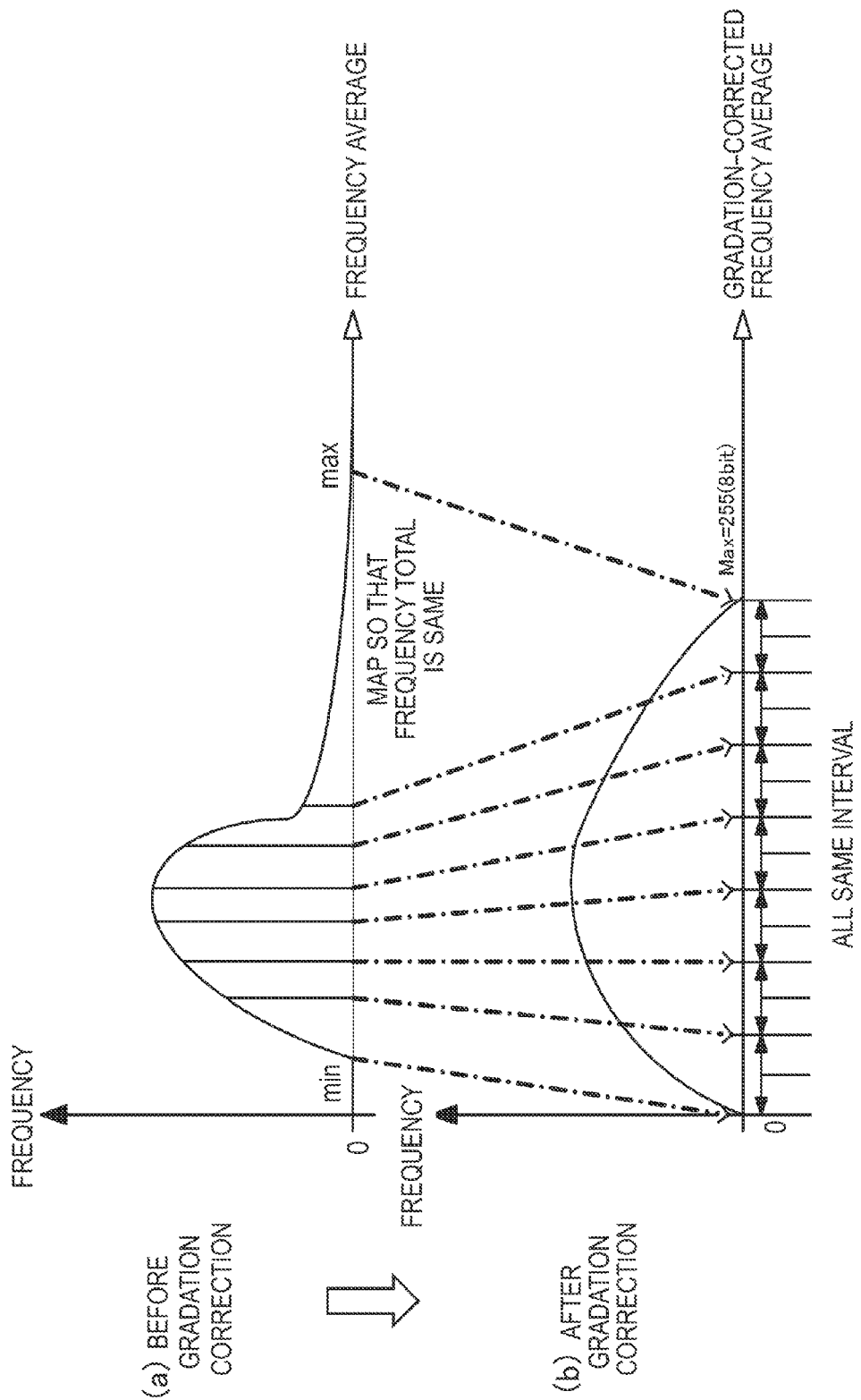
FIG. 17 is a diagram illustrating gradation correction processing.

FIG. 17 illustrates:
(a) a histogram of average luminance before gradation correction (=a histogram of the average luminance of the representative luminance pixel image 622); and
(b) a histogram of average luminance after gradation correction (=a histogram of the average luminance of the representative pixel updated image 641).

The gradation correction illustrated in FIG. 17 is an example of gradation correction in which corrected average luminance is set in 0 to 255 8-bit data.

As illustrated in FIG. 17, gradation correction is performed based on processing that changes (a) a histogram of average luminance before gradation correction into (b) a histogram of average luminance after gradation correction. Note that the processing illustrated in FIG. 17 is gradation correction based on histogram extension for determining a tone curve so that a frequency surface area is uniform when a distribution of the average luminance of all of the representative pixels is viewed in the histogram.

Thus, in step S531 illustrated in FIG. 16, the representative pixel update unit 403 generates the representative pixel updated image 641 by performing gradation correction of the average luminance component set in each representative pixel of the above representative luminance pixel image 622, namely, an [average luminance, luminance variation, flag-n-bit-3ch-w×h image].

The representative pixel updated image 641 is also an [average luminance, luminance variation, flag-n-bit-3ch-w×h image] with the above settings. However, the bit number of the average luminance is set to 8 bits.

(5-1-4. Processing Performed by the Corrected Image Generation Unit)

Next, the processing performed by the corrected image generation unit 404 in the image processing unit 400 illustrated in FIG. 13 will be described.

The processing performed by the corrected image generation unit 404 will now be described with reference to FIG. 18.

Figure 18:
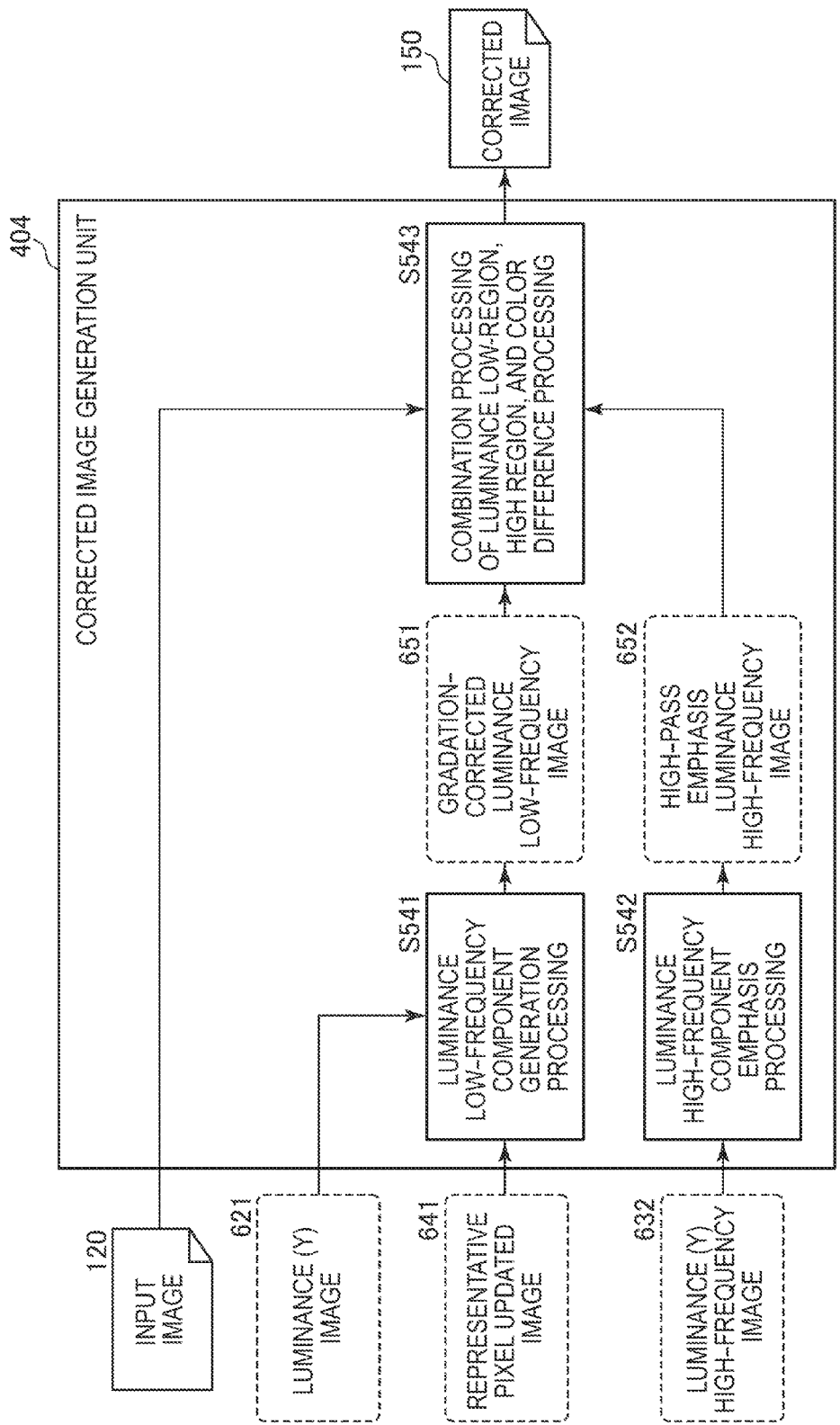
FIG. 18 is a diagram illustrating a configuration of a corrected image generation unit, and processing performed by this unit.

As illustrated in FIG. 18, the corrected image generation unit 404 inputs the following images.
(1) The input image 120
(2) The luminance image 621 generated by the representative pixel calculation unit 401
(3) The representative pixel updated image 641 generated by the representative pixel update unit
(4) The high-frequency image 632 generated by the band separation luminance image generation unit 402

In step S541 illustrated in FIG. 18, the corrected image generation unit 404 inputs the luminance image 621 generated by the representative pixel calculation unit 401, namely, an [luminance-8-bit-1ch-w×h image], and the representative pixel updated image 641 generated by the representative pixel update unit, namely, an [average luminance, luminance variation, flag-n-bit-3ch-w×h image], and generates a gradation-corrected luminance low-frequency image 651.

Specifically, the corrected image generation unit 404 performs the following processing.

The gradation-corrected luminance low-frequency image 651 in which a low-frequency luminance value has been set for each pixel is generated by calculating a tone curve determined from the average luminance and the luminance variation of the representative pixels using both the average luminance and luminance variation information set in the representative pixels of the representative pixel updated image 641, and executing smoothening processing on the luminance value Y (x,y) set for each pixel of the image 621 based on the tone curve.

For the low-frequency luminance value set for each pixel of the gradation-corrected luminance low-frequency image 651, a similar formula to (Formula 11) described for the processing performed in step S521 of FIG. 15 is applied.

However, in (Formula 11),
$\mu$ represents the average luminance of the closest representative pixel of each pixel,
$\sigma^2$ represents the luminance value variance of the representative pixels, and
$\sigma_n^2$ represents the variance of the estimated noise (if unknown, this value is set as 1).

These values are all determined using the average luminance and luminance variation information set in the representative pixels of the representative pixel updated image 641.

In step S541 illustrated in FIG. 18, the gradation-corrected luminance low-frequency image 651 in which a low-frequency luminance value has been set for each pixel is generated based on the above processing.

The gradation-corrected luminance low-frequency image 651 is a [gradation-corrected luminance low-frequency luminance (Y)-8-bit-1ch-w×h image] with the above settings.

In addition, in step S542 illustrated in FIG. 18, the corrected image generation unit 404 inputs the high-frequency image 632 generated by the band separation luminance image generation unit 402, namely, a [high-frequency luminance (Y)-8-bit-1ch-w×h image] with the above settings, and generates a high-pass emphasis luminance high-frequency image 652 by executing high-pass component emphasis processing.

Various methods can be applied for performing the high-pass emphasis processing performed for this processing.

For example, a pixel value $Y_{high}'(x,y)$ forming the high-pass emphasis luminance high-frequency image 652 is calculated according to the following (Formula 13), which multiplies the pixel value $Y_{high}(x,y)$ of the high-frequency image 632 by a given constant G (=1.1 etc.).

$$Y_{high}'(x,y)=G \times Y(x,y) \qquad \text{(Formula 13)}$$

In step S542 illustrated in FIG. 18, the high-pass emphasis luminance high-frequency image 652 obtained by performing high-pass emphasis on each pixel is generated based on the above-described processing.

The high-pass emphasis luminance high-frequency image 652 is a [high-pass emphasis high-frequency luminance (Y)-8-bit-1ch-w×h image] with the above settings.

Further, in step S543 illustrated in FIG. 18, the corrected image generation unit 404 inputs:
(1) the input image 120,
(2) the gradation-corrected luminance low-frequency image 651 generated in step S541, and
(3) the high-pass emphasis luminance high-frequency image 652 generated in step S542,
and generates a corrected image 150, which is an output image.

The corrected image 150 is an image in which RGB pixel values have been set for each pixel.

Specifically, the following processing is performed.

The corrected image generation unit 404 generates a corrected image 150 in which RGB pixel values have been set for each pixel by performing luminance low-pass and high-pass processing and color difference component combination processing on the gradation-corrected luminance low-frequency image 651 generated in step S541, namely, a [gradation-corrected low-frequency luminance (Y)-8-bit-1ch-w×h image] with the above settings, the high-pass emphasis luminance high-frequency image 652 generated in step S542, namely, a [high-pass emphasis high-frequency luminance (Y)-8-bit-1ch-w×h image] with the above settings, and the input image 120, namely, an [RGB-8-bit-3ch-w×h image] with the above settings.

The pixel values (Rout, Gout, Bout) of the corrected image 150 are calculated according to the following (Formula 14).

$$R_{out} = Y_{out} + 1.403 \times (Cr_{in} - 128)$$

$$G_{out} = Y_{out} - 0.344 \times (Cr_{in} - 128) - 0.714 \times (Cb_{in} - 128)$$

$$B_{out} = Y_{out} + 1.773 \times (Cb_{in} - 128)$$

wherein $$Y_{in} = 0.299 \times R_{in} + 0.587 \times G_{in} + 0.144 \times B_{in}$$

$$Cr_{in} = (R_{in} - Y_{in}) \times 0.173 + 128$$

$$Cb_{in} = (B_{in} - Y_{in}) \times 0.564 + 128$$

$$Y_{out} = Y_{low}' + Y_{high}' \qquad \text{(Formula 14)}$$

In (Formula 14),
Rin, Gin, and Bin are the respective RGB pixel values of the input image 120,
$Y_{low}'$ is the pixel value (luminance value) of the gradation-corrected luminance low-frequency image 651, and
$Y_{high}'$ is the pixel value (luminance value) of the high-pass emphasis luminance high-frequency image 652.

In step S543 illustrated in FIG. 18, a corrected image 150 in which respective RGB pixel values have been set for each pixel is generated based on the above processing.

The corrected image 150 is an [RGB-8-bit-3ch-w×h image] with the above settings.

Thus, in this embodiment of the present disclosure, a corrected image 150 that has been subjected to image gradation correction is generated and output by setting the "average luminance and luminance variation as the DC component of luminance (Y)" in the representative pixels, and executing gradation correction processing of the representative pixels with the representative pixel update unit.

[5-2. Embodiment in which False Color Correction and Storage Color Correction are Performed]

Next, as a third embodiment of the present disclosure, an embodiment in which false color correction and storage color correction are performed will be described.

Figure 19:
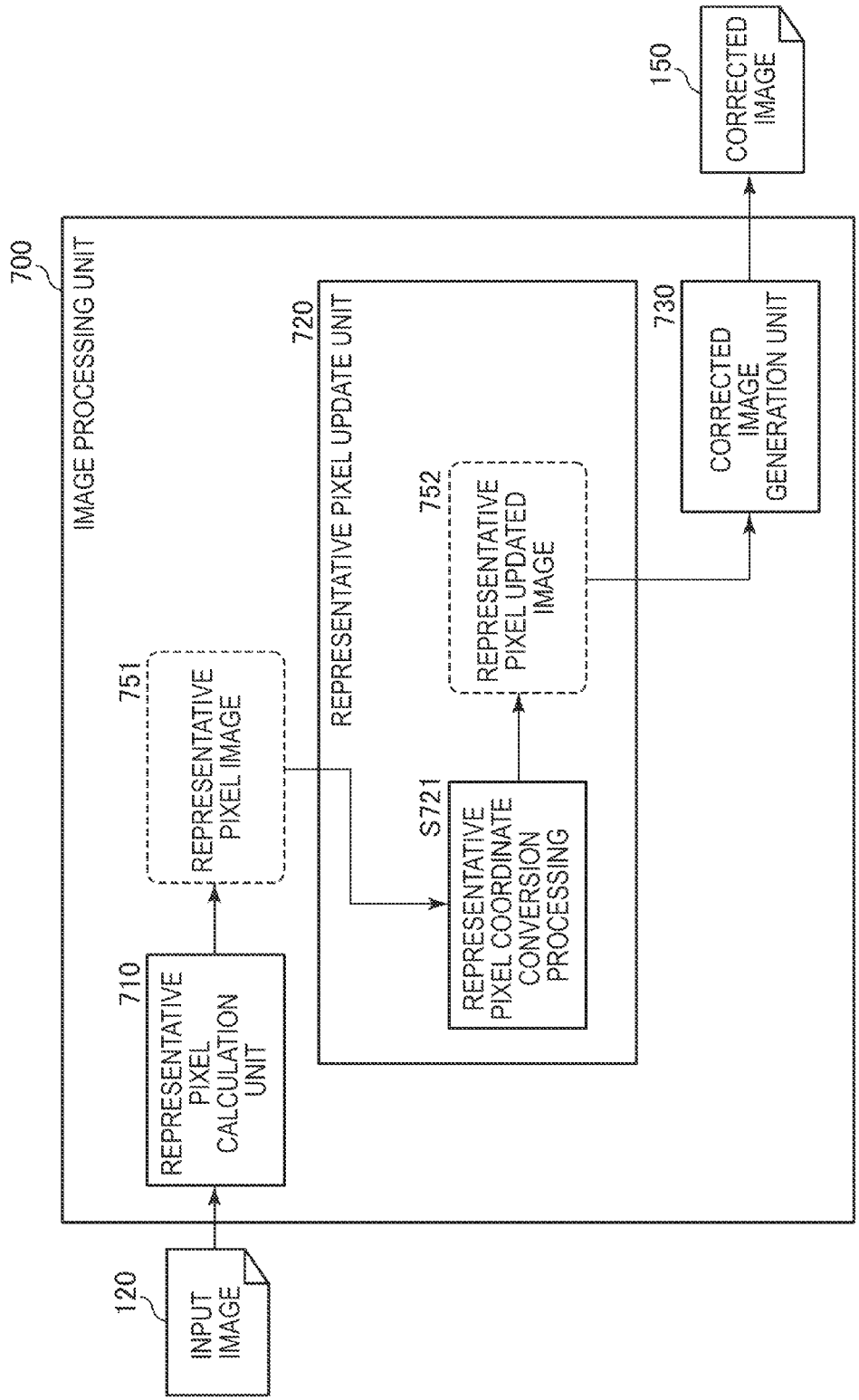
FIG. 19 is a diagram illustrating a configuration of an image processing apparatus according to a third embodiment of the present disclosure, and a processing example thereof.

FIG. 19 illustrates a configuration example of an image processing unit 700 in the image processing apparatus that executes the image processing according to this embodiment of the present disclosure.

The image processing unit 700 inputs an input image 120, which is an image on which false color correction and storage color correction are to be performed, and outputs a corrected image 150 on which gradation correction was executed.

The image processing unit 700 illustrated in FIG. 19 includes, for example, a DSP (digital signal processor) in the imaging apparatus. Alternatively, the image processing unit 100 can be configured in an image processing apparatus such as a PC that executes processing based on a program that prescribes the image processing according to the present disclosure.

As illustrated in FIG. 19, the image processing unit 700 includes a representative pixel calculation unit 710, a representative pixel update unit 720, and a corrected image generation unit 730.

The representative pixel update unit 720 has a representative pixel coordinate conversion processing unit 721.

The representative pixel calculation unit 710 has a similar configuration and executes similar processing to the representative pixel calculation unit 101 according to the first embodiment of the present disclosure described above with reference to FIG. 2 and FIGS. 3 to 9.

Similar to the representative pixel calculation unit 101 according to the first embodiment of the present disclosure, the representative pixel calculation unit 710 generates an image that is formed from gray pixels in which unique Y, CB, and Cr pixel values are set for the representative pixels, and for the pixels other than the representative pixels, a unique Y and uniform Cr and Cb (=128) are set.

In step S721 illustrated in FIG. 19, the representative pixel update unit 720 selects a given representative pixel in which the pixel values are in a predetermined range from among the representative pixels in the image generated by the representative pixel calculation unit 710, and converts and updates the coordinates of a pixel value P(x,y) of the selected representative pixel to a new pixel value P'(x,y). Here, P is a three-dimensional vector having YCbCr values.

The pixel value conversion processing is executed based on the following (Formula 15).

$$\begin{pmatrix} Yout \\ Cbout \\ Crout \end{pmatrix} = \begin{pmatrix} C11 & Cr12 & C13 \\ C21 & C22 & C23 \\ C31 & C32 & C33 \end{pmatrix} \begin{pmatrix} Yin \\ Cbin \\ Crin \end{pmatrix} \qquad \text{(Formula 15)}$$

Note that in (Formula 15), Cxy is a pixel value coordinate conversion parameter that is set, for example, based on the characteristics of a sensor, a light source or the like.

Thus, the representative pixel update unit 720 selects a given representative pixel in which the pixel value are in a predetermined range from among the representative pixels in the image generated by the representative pixel calculation unit 710, and performs a matrix calculation on the pixel values of the selected representative pixel. Based on this processing, a representative pixel updated image 752 is generated.

The corrected image generation unit 730 inputs the representative pixel updated image 752 generated by the representative pixel update unit 720, and generates and outputs a corrected image 150.

The corrected image generation unit 730 has a similar configuration and executes similar processing to the corrected image generation unit 103 according to the first embodiment of the present disclosure described above with reference to FIG. 12.

The corrected image generation unit 730 generates the corrected image 150 by performing color difference information generation processing on the representative pixel updated image 752 based on the pixel values (Cb and Cr) of the representative pixels, and also executes pixel value conversion processing for converting the YCbCr pixel values into RGB pixel values.

In this embodiment of the present disclosure, the representative pixel update unit 720, for example, selects a pixel having pixel values that are determined to be inappropriate as a representative pixel, performs a correction based on the above-described matrix calculation, and performs a color information setting by applying the corrected representative pixel. Based on this processing, for example, false color correction and storage color correction of mixed colors and the like occurring among the pixels are realized.

6. Image Processing Unit Configuration Examples

The image processing unit executing the image processing described in the above embodiments of the present disclosure includes, for example, a DSP (digital signal processor) in an imaging apparatus. Alternatively, the image processing unit can be configured in an image processing apparatus such as a PC that executes processing based on a program that prescribes the image processing according to the present disclosure.

A configuration of an imaging apparatus, which is a configuration example of an image processing apparatus that executes the image processing according to the present disclosure, will now be described with reference to FIG. 20.

Figure 20:
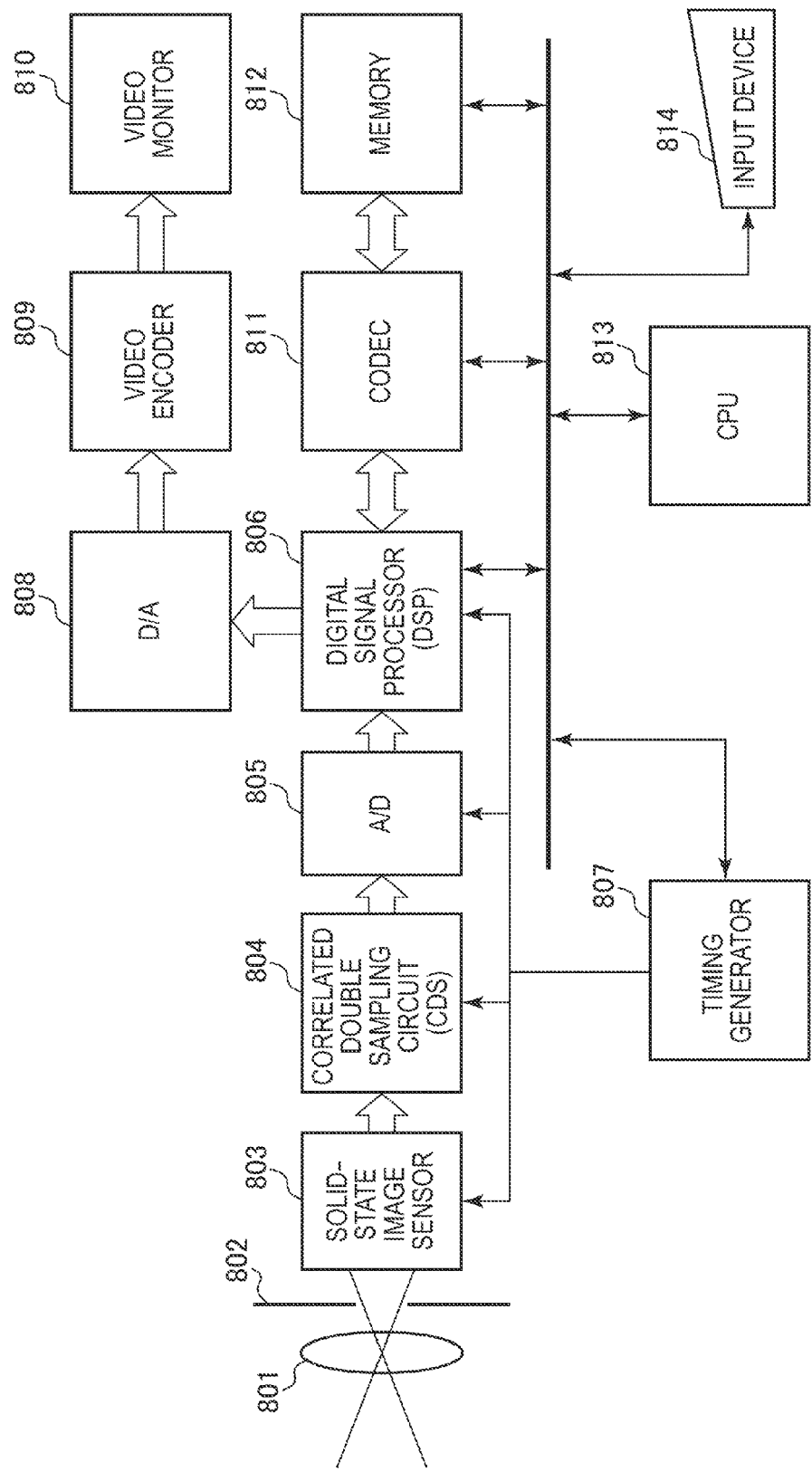
FIG. 20 is a diagram illustrating a configuration example of an image processing apparatus.

The imaging apparatus illustrated in FIG. 20 has a lens 801, a diaphragm 802, a solid-state image sensor 803, a correlated double sampling circuit 804, an A/D converter 805, a digital signal processor (DSP) 806, a timing generator 807, a D/A converter 808, a video encoder 809, a video monitor 810, a codec 811, a memory 812, a CPU 813, and an input device 814.

The input device 814 includes operation buttons, such as an imaging button, on the camera body. Further, the digital signal processor (DSP) 806 is a block having a processor for signal processing and an image RAM. The processor for signal processing executes preprogrammed image processing on image data stored in the image RAM.

For example, the processor for signal processing executes the processing performed by the image processing unit described in the above respective embodiments of the present disclosure.

Incident light that has passed through the optical system and reached the solid-state image sensor 803 hits the respective light receiving elements on the imaging surface. The light is then photoelectrically converted into an electric signal by the light receiving elements. Noise is removed by the correlated double sampling circuit 804, and the resultant signal is converted into a digital signal by the A/D converter 805. The digital signals is then temporarily stored in an image memory in the digital signal processor (DSP) 806.

During an imaging state, the timing generator 807 controls the signal processing system so as to maintain image capturing at a fixed frame rate. A stream of pixels is also transmitted at a fixed rate to the digital signal processor (DSP) 806. After suitable image processing has been performed, the image data is transmitted to the D/A converter 808, or codec 811, or both of these. The D/A converter 808 converts the image data transmitted from the digital signal processor (DSP) 806 into an analog signal, which is converted by the video encoder 809 into a video signal. This video signal is displayed on the video monitor 810.

The codec 811 performs encoding on the image data transmitted from the digital signal processor (DSP) 806. This encoded image data is recorded in the memory 812. This memory 812 may be a recording device that uses a semiconductor, a magnetic recording medium, a magneto-optical recording medium, an optical recording medium and the like.

The image processing according to the embodiments of the present disclosure described above is executed as processing performed by the digital signal processor (DSP) 806 in the imaging apparatus illustrated in FIG. 20, for example.

Note that the processing according to the present disclosure is not limited to an imaging apparatus like that illustrated in FIG. 20. This processing can also be executed by an image processing apparatus such as a PC that executes processing based on a program that prescribes the image processing according to the present disclosure.

8. Conclusion of Constitution of Present Disclosure

So far, the embodiment of the present disclosure has been described in detail with reference to a specific embodiment. However, it should be noted that various variations and alternative embodiments will become apparent to those skilled in the art without departing from the scope of the present disclosure. That is, it should be noted that the present disclosure is disclosed through embodiments and is not construed in a manner limited by these embodiments. In order to determine the scope of the present disclosure, it is necessary to consider the scope of the claims.

Additionally, the present technology may also be configured as below.

(1) An image processing apparatus including:
a representative pixel calculation unit configured to select some pixels in an input image as representative pixels;
a representative pixel update unit configured to update pixel values of the representative pixels; and
a corrected image generation unit configured to set pixel values for pixels other than the representative pixels by applying the updated pixel values of the representative pixels,
wherein the representative pixel update unit is configured to, based on pixels around a position of the representative pixels in a smoothed image generated based on the input image as reference pixels, execute pixel value correction of the representative pixels by applying the pixel values of the reference pixels.

(2) The image processing apparatus according to (1),
wherein the representative pixel calculation unit is configured to generate a YCbCr image in which luminance Y and color difference Cb and Cr pixel values are set for each pixel based on the input image, and generate a representative pixel image formed from representative pixels in which unique YCbCr pixel values, respectively, are set for the representative pixels, and non-representative pixels in which a unique luminance Y and uniform Cb and Cr values are set for each pixel, based on the YCbCr image, and
wherein the representative pixel update unit is configured to, based on pixels around a position of the representative pixels in a color difference smoothed image generated by executing color difference smoothening processing on the YCbCr image as reference pixels, execute pixel value update of the representative pixels by applying the pixel values of the reference pixels.

(3) The image processing apparatus according to (2),
wherein the representative pixel update unit is configured to update the respective pixel values of color difference information Cb and Cr of the representative pixels by applying the respective pixel values of the color difference information Cb and Cr of pixels around a position of the representative pixels in a color difference smoothed image generated by executing color difference smoothening processing on the YCbCr image.

(4) The image processing apparatus according to (2) or (3),
wherein the representative pixel update unit is configured to calculate a reliability of each pixel value of the color difference smoothed image based on a pixel value difference between the color difference smoothed image and the YCbCr image, and calculate an updated pixel value of the representative pixels by setting a pixel value contribution ratio of the reference pixels based on the reliability.

(5) The image processing apparatus according to any one of (2) to (4), wherein the representative pixel update unit is configured to calculate an updated pixel value of the representative pixels by setting a pixel value contribution ratio of the reference pixels based on a weighting that is set so as to decrease the greater a distance between the reference pixels and the representative pixels is.

(6) The image processing apparatus according to any one of (1) to (5), wherein the representative pixel calculation unit is configured to perform a representative pixel calculation by executing clustering processing that applies a K-means method (K averaging method).

(7) The image processing apparatus according to (6), wherein the representative pixel calculation unit is configured to perform a representative pixel calculation by executing clustering processing that applies a K-means method (K averaging method) on a reduced image obtained by reducing a YCbCr image generated from the input image.

(8) The image processing apparatus according to (7), wherein the representative pixel calculation unit is configured to perform a representative pixel calculation by executing clustering processing that applies a K-means method (K averaging method) on a reduced image obtained by reducing a YCbCr image generated from the input image, and generate an image having the same number of pixels as the input image based on up sampling processing.

(9) The image processing apparatus according to any one of (1) to (8), wherein the corrected image generation unit is configured to generate color difference information Cb and Cr about non-representative pixels based on interpolation processing that applies color difference information Cb and Cr set in the updated representative pixels by the representative pixel update unit.

(10) The image processing apparatus according to (9), wherein the corrected image generation unit is configured to generate the color difference information Cb and Cr about non-representative pixels by utilizing a local linear correlation between luminance Y and color difference Cb and Cr.

(11) An image processing apparatus including:
a representative pixel calculation unit configured to select some pixels in an input image as representative pixels;
a band separation luminance image generation unit configured to generate a band separation luminance image based on an input image;
a representative pixel update unit configured to update pixel values of the representative pixels; and
a corrected image generation unit configured to generate a gradation-corrected image of the input image by applying the updated pixel values of the representative pixels and the band separation luminance image,
wherein the representative pixel update unit is configured to generate a representative pixel updated image on which gradation correction was executed on an average luminance component of a representative pixel image generated based on the input image, and the corrected image generation unit is configured to generate a gradation-corrected image of the input image by applying the representative pixel updated image.

(12) The image processing apparatus according to (11), wherein the band separation luminance image generation unit is configured to generate, based on the input image, a luminance low-frequency image in which a luminance low-frequency signal is a pixel value and a luminance high-frequency image in which a luminance high-frequency signal is a pixel value.

(13) An image processing apparatus including:
a representative pixel calculation unit configured to select some pixels in an input image as representative pixels;
a representative pixel update unit configured to update pixel values of the representative pixels; and
a corrected image generation unit configured to set pixel values for pixels other than the representative pixels by applying the updated pixel values of the representative pixels,
wherein the representative pixel update unit is configured to execute pixel value update of the representative pixels by converting the pixel values of the representative pixels based on a calculation using a matrix in which a pixel value coordinate conversion parameter is set.

Further, a method of a process executed in the aforementioned apparatus or the like, a program for executing a process, and a recording medium having the program recorded thereon are all included in the configuration of an embodiment of the present disclosure.

Furthermore, the processing sequence that is explained in the specification can be implemented by hardware, by software and by a configuration that combines hardware and software. In a case where the processing is implemented by software, it is possible to install in memory within a computer that is incorporated into dedicated hardware a program in which the processing sequence is encoded and to execute the program. It is also possible to install a program in a general-purpose computer that is capable of performing various types of processing and to execute the program. For example, the program can be installed in advance in a storage medium. In addition to being installed in a computer from the storage medium, the program can also be received through a network, such as a local area network (LAN) or the Internet, and can be installed in a storage medium such as a hard disk or the like that is built into the computer.

Note that the various types of processing that are described in this specification may not only be performed in a temporal sequence as has been described, but may also be performed in parallel or individually, in accordance with the processing capacity of the device that performs the processing or as necessary. Furthermore, the system in this specification is not limited to being a configuration that logically aggregates a plurality of devices, all of which are contained within the same housing.

Thus, as described above, according to a configuration of an embodiment of the present disclosure, an apparatus and a method for generating an image with little noise are realized.

Specifically, for example, the apparatus according to the present disclosure has a representative pixel calculation unit configured to select some pixels in an image as representative pixels, a representative pixel update unit configured to update pixel values of the representative pixels, and a corrected image generation unit configured to set pixel values for pixels other than the representative pixels by applying the updated pixel values of the representative pixels. The representative pixel update unit is configured to, based on pixels around a position of the representative pixels in a smoothed image generated based on an input image as reference pixels, execute pixel value correction of the representative pixels by applying the pixel values of the reference pixels. For example, the representative pixel update unit is configured to calculate updated pixel values of the representative pixels by setting a reliability of each pixel value of a color difference smoothed image based on a pixel value difference between the color difference smoothed image and the input image, and a contribution ratio based on a weighting that is based on a distance between the reference pixels and the representative pixels.

Based on these processes, the setting of more accurate representative pixels and generation of reduced-noise images are realized, in which the chance of mistaken pixel values being set for the representative pixels is decreased.

It should be understood by those skilled in the art that various modifications, combinations, sub-combinations and alterations may occur depending on design requirements and other factors insofar as they are within the scope of the appended claims or the equivalents thereof.

The present disclosure contains subject matter related to that disclosed in Japanese Priority Patent Application JP 2012-087776 filed in the Japan Patent Office on Apr. 6, 2012, the entire content of which is hereby incorporated by reference.

What is claimed is:

1. An image processing apparatus comprising:
one or more processors configured to:
one or more pixels in an input image as representative pixels;
update pixel values of the representative pixels; and
set pixel values for pixels other than the representative pixels by applying the updated pixel values of the representative pixels,
wherein the one or more processors are configured to, based on pixels around a position of the representative pixels in a smoothed image generated based on the input image as reference pixels, execute pixel value correction of the representative pixels by applying pixel values of the reference pixels.

2. The image processing apparatus according to claim 1, wherein the one or more processors are configured to generate a YCbCr image in which luminance Y and color difference Cb and Cr pixel values are set for each pixel based on the input image, and generate a representative pixel image formed from the representative pixels in which unique YCbCr pixel values, respectively, are set for the representative pixels, and pixels other than the representative pixels in which a unique luminance Y and uniform Cb and Cr pixel values are set for each pixel, based on the YCbCr image,
wherein the one or more processors are configured to, based on pixels around a position of the representative pixels in a color difference smoothed image generated by executing color difference smoothening processing on the YCbCr image as reference pixels, execute pixel value update of the representative pixels by applying the pixel values of the reference pixels.

3. The image processing apparatus according to claim 2, wherein the one or more processors are configured to update the respective pixel values of color difference information Cb and Cr of the representative pixels by applying the respective pixel values of the color difference information Cb and Cr of pixels around a position of the representative pixels in a color difference smoothed image generated by executing color difference smoothening processing on the YCbCr image.

4. The image processing apparatus according to claim 2, wherein the one or more processors are configured to calculate a reliability of each pixel value of the color difference smoothed image based on a pixel value difference between the color difference smoothed image and the YCbCr image, and calculate an updated pixel value of the representative pixels by setting a pixel value contribution ratio of the reference pixels based on the reliability.

5. The image processing apparatus according to claim 2, wherein the one or more processors are configured to calculate an updated pixel value of the representative pixels by setting a pixel value contribution ratio of the reference pixels based on a weighting that is set based on a distance between the reference pixels and the representative pixels.

6. The image processing apparatus according to claim 1, wherein the one or more processors are configured to perform a representative pixel calculation by executing clustering processing that applies a K-means method or a K averaging method.

7. The image processing apparatus according to claim 1, wherein the one or more processors are configured to perform a representative pixel calculation by executing clustering processing that applies a K-means method or a K averaging method on a reduced image obtained by reducing a YCbCr image generated from the input image.

8. The image processing apparatus according to claim 1, wherein the one or more processors are configured to perform a representative pixel calculation by executing clustering processing that applies a K-means method or a K averaging method on a reduced image obtained by reducing a YCbCr image generated from the input image, and generate an image having the same number of pixels as the input image based on up sampling processing.

9. The image processing apparatus according to claim 1, wherein the one or more processors are configured to generate color difference information Cb and Cr for pixels other than the representative pixels based on interpolation processing that applies color difference information Cb and Cr set in the representative pixels having updated pixel values.

10. The image processing apparatus according to claim 9, wherein the one or more processors are configured to generate the color difference information Cb and Cr for pixels other than the representative pixels by utilizing a local linear correlation between luminance Y and color difference Cb and Cr.

11. An image processing method executed in an image processing apparatus, the method comprising:
executing, by a representative pixel calculation unit, representative pixel calculation processing to select one or more pixels in an input image as representative pixels;
executing, by a representative pixel update unit, representative pixel update processing to update pixel values of the representative pixels; and
executing, by a corrected image generation unit, corrected image generation processing to set pixel values for pixels other than the representative pixels by applying the updated pixel values of the representative pixels,
wherein in the representative pixel update processing, the representative pixel update unit is configured to, based on pixels around a position of the representative pixels in a smoothed image generated based on the input image as reference pixels, execute pixel value correction of the representative pixels by applying pixel values of the reference pixels.

12. A non-transitory computer readable medium having stored thereon, a set of computer-executable instructions for causing the computer to:
execute representative pixel calculation processing to select one or more pixels in an input image as representative pixels;
execute representative pixel update processing to update pixel values of the representative pixels; and
execute corrected image generation processing to set pixel values for pixels other than the representative pixels by applying the updated pixel values of the representative pixels,
wherein in the representative pixel update processing, based on pixels around a position of the representative pixels in a smoothed image generated based on the input image as reference pixels, pixel value correction of the representative pixels is executed by applying pixel values of the reference pixels.

* * * * *